United States Patent
Ciuc et al.

(10) Patent No.: US 11,600,013 B2
(45) Date of Patent: *Mar. 7, 2023

(54) FACIAL FEATURES TRACKER WITH ADVANCED TRAINING FOR NATURAL RENDERING OF HUMAN FACES IN REAL-TIME

(71) Applicant: FotoNation Limited, Galway (IE)

(72) Inventors: Mihai Ciuc, Bucharest (RO); Stefan Petrescu, Bucharest (RO); Emanuela Haller, Bucharest (RO); Florin Oprea, Bucharest (RO); Alexandru Nicolaescu, Bucharest (RO); Florin Nanu, Bucharest (RO); Iulian Palade, Bucharest (RO)

(73) Assignee: FotoNation Limited

( * ) Notice: Subject to any disclaimer, the term of this patent is extended or adjusted under 35 U.S.C. 154(b) by 157 days.

This patent is subject to a terminal disclaimer.

(21) Appl. No.: 16/921,723

(22) Filed: Jul. 6, 2020

(65) Prior Publication Data

US 2020/0334853 A1 Oct. 22, 2020

Related U.S. Application Data

(63) Continuation of application No. 15/912,946, filed on Mar. 6, 2018, now Pat. No. 10,706,577.

(51) Int. Cl.
*G06V 40/16* (2022.01)
*G06T 7/73* (2017.01)
*G06T 13/40* (2011.01)

(52) U.S. Cl.
CPC .............. *G06T 7/73* (2017.01); *G06T 13/40* (2013.01); *G06V 40/168* (2022.01); *G06T 2215/16* (2013.01)

(58) Field of Classification Search
CPC ..... G06T 17/00; G06T 19/00; G06T 2215/16; G06T 7/73; G06T 13/40; G06T 15/00; G06K 9/00268; G06V 40/168
See application file for complete search history.

(56) References Cited

U.S. PATENT DOCUMENTS

| 6,504,546 B1 * | 1/2003 | Cosatto | G06T 13/40 345/473 |
| 7,239,321 B2 * | 7/2007 | Berger | G06T 13/40 704/E21.02 |

(Continued)

OTHER PUBLICATIONS

Thomas Heseltine, Nick Pears, Jim Austin ; "Three-dimensional face recognition using combinations of surface feature map subspace components", Elsevier 2007.

(Continued)

*Primary Examiner* — Shaghayegh Azima
(74) *Attorney, Agent, or Firm* — Lerner, David, Littenberg, Krumholz & Mentlik, LLP

(57) ABSTRACT

Tracking units for facial features with advanced training for natural rendering of human faces in real-time are provided. An example device receives a video stream, and upon detecting a visual face, selects a 3D model from a comprehensive set of head orientation classes. The device determines modifications to the selected 3D model to describe the face, then projects a 2D model of tracking points of facial features based on the 3D model, and controls, actuates, or animates hardware based on the facial features tracking points. The device can switch among an example comprehensive set of 35 different head orientation classes for each video frame, based on suggestions computed from a previous video frame or from yaw and pitch angles of the visual head orientation. Each class of the comprehensive set is trained separately based on a respective collection of automatically marked images for that head orientation class.

20 Claims, 19 Drawing Sheets

(56) References Cited

U.S. PATENT DOCUMENTS

| | | | | |
|---|---|---|---|---|
| 9,775,512 B1* | 10/2017 | Tyler | | G06V 20/64 |
| 9,817,248 B2* | 11/2017 | Yang | | G06T 17/00 |
| 11,237,699 B2* | 2/2022 | Mamaril | | G06F 3/0482 |
| 2003/0123713 A1* | 7/2003 | Geng | | G06V 10/772 |
| | | | | 348/47 |
| 2003/0146901 A1* | 8/2003 | Ryan | | G06V 10/25 |
| | | | | 345/158 |
| 2007/0050639 A1* | 3/2007 | Nakano | | G06V 20/647 |
| | | | | 713/186 |
| 2010/0007665 A1* | 1/2010 | Smith | | G06T 13/40 |
| | | | | 345/473 |
| 2013/0121526 A1* | 5/2013 | Smolyanskiy | | G06T 13/20 |
| | | | | 382/103 |
| 2013/0129158 A1* | 5/2013 | Wang | | G06T 19/00 |
| | | | | 382/118 |
| 2013/0287294 A1* | 10/2013 | Ye | | G06T 17/00 |
| | | | | 382/154 |
| 2014/0022249 A1* | 1/2014 | Ye | | G06V 10/462 |
| | | | | 345/420 |
| 2014/0043329 A1* | 2/2014 | Wang | | G06V 10/446 |
| | | | | 345/420 |
| 2014/0201126 A1* | 7/2014 | Zadeh | | A61B 5/7221 |
| | | | | 706/52 |
| 2014/0212031 A1* | 7/2014 | Tytgat | | G06T 19/20 |
| | | | | 382/154 |
| 2015/0084950 A1* | 3/2015 | Li | | G06K 9/6247 |
| | | | | 345/419 |
| 2015/0186425 A1* | 7/2015 | Chang | | G06F 16/58 |
| | | | | 707/728 |
| 2015/0310667 A1* | 10/2015 | Young | | G06F 3/048 |
| | | | | 345/633 |
| 2016/0042557 A1* | 2/2016 | Lin | | G06T 7/73 |
| | | | | 345/426 |
| 2016/0110909 A1* | 4/2016 | Kim | | G06F 16/56 |
| | | | | 345/419 |
| 2016/0210500 A1* | 7/2016 | Feng | | G06V 10/7553 |
| 2016/0217318 A1* | 7/2016 | Hayasaka | | G06V 40/172 |
| 2016/0224852 A1* | 8/2016 | Vicente | | B60Q 9/00 |
| 2016/0261853 A1* | 9/2016 | Surkov | | G06T 17/00 |
| 2017/0018121 A1* | 1/2017 | Lawson | | G06T 19/006 |
| 2017/0116735 A1* | 4/2017 | Aughey | | G06V 20/647 |
| 2017/0316598 A1* | 11/2017 | Wang | | G06T 19/20 |
| 2018/0000385 A1* | 1/2018 | Heaton | | G08B 25/016 |
| 2018/0032997 A1* | 2/2018 | Gordon | | G06Q 30/0269 |
| 2018/0101989 A1* | 4/2018 | Frueh | | G06T 19/20 |
| 2018/0121716 A1* | 5/2018 | Sun | | G06V 40/165 |
| 2018/0197330 A1* | 7/2018 | Wang | | G06V 40/171 |
| 2020/0302670 A1* | 9/2020 | Chen | | G06V 40/176 |
| 2022/0020213 A1* | 1/2022 | Haslam | | G06T 19/00 |

OTHER PUBLICATIONS

Mingli Song, Dacheng Tao, Xiaoqin Huang Chun Chen, and Jiajun Bu; "Three-Dimensional Face Reconstruction From a Single Image by a Coupled RBF Network"; IEEE 2012.

* cited by examiner

RIGHT-HANDED CARTESIAN SYSTEM OF COORDINATES
FOR 3D SPACE

HEAD AT PITCH = 0

YAW (DEGREES) 1002

| | -90 to -51 | -50 to -36 | -35 to -11 | -10 to 10 | 11 to 35 | 36 to 50 | 51 to 90 |
|---|---|---|---|---|---|---|---|
| -90 to -41 | P_LEFT_UP2 | SP2-LEFT_UP2 | SP1-LEFT_UP2 | FRONTAL_UP2 | SP1-RIGHT_UP2 | SP2-RIGHT_UP2 | P_RIGHT_UP2 |
| -40 to -21 | P_LEFT_UP1 | SP2_LEFT_UP1 | SP1_LEFT_UP1 | FRONTAL_UP1 | SP1_RIGHT_UP1 | SP2_RIGHT_UP1 | P_RIGHT_UP1 |
| -20 to -20 | P_LEFT_MIDDLE | SP2_LEFT_MIDDLE | SP1_LEFT_MIDDLE | FRONTAL MIDDLE | SP1_RIGHT_MIDDLE | SP2_RIGHT_MIDDLE | P_RIGHT_MIDDLE |
| -21 to -40 | P_LEFT_DOWN1 | SP2_LEFT_DOWN1 | SP1_LEFT_DOWN1 | FRONTAL_DOWN1 | SP1_RIGHT_DOWN1 | SP2_RIGHT_DOWN1 | P_RIGHT_DOWN1 |
| -41 to 90 | P_LEFT_DOWN2 | SP2_LEFT_DOWN2 | SP1_LEFT_DOWN2 | FRONTAL_DOWN2 | SP1_RIGHT_DOWN2 | SP2_RIGHT_DOWN2 | P_RIGHT_DOWN2 |

PITCH (DEGREES) 1004

*FIG. 10*

FACIAL FEATURES TRACKER WITH ADVANCED TRAINING FOR NATURAL RENDERING OF HUMAN FACES IN REAL-TIME

CROSS-REFERENCE TO RELATED APPLICATIONS

This application is a continuation of U.S. patent application Ser. No. 15/912,946 filed Mar. 6, 2018, which is incorporated by reference herein in its entirety.

BACKGROUND

As a general class, constrained local models (CLMs) are conventional methods of finding sets of points on a subject image, as constrained by a statistical shape model. Generally, a region from an image is sampled and projected onto a reference frame to generate a response image using local models, where each point has a cost for its estimated location. In the case of an image of a human face and the pose of the associated human head, the parameters of the statistical shape model, and sometimes pose models, are then varied to find an optimal combination of points that minimizes the total cost, thereby representing the face and the head pose in the image.

One main drawback of conventional CLM schemes for modeling facial features is a limited range of working head rotations in the models. The 2-dimensional (2D) context of each landmark point changes drastically with changes in the "yaw" and "pitch" angles of the 3D head pose, for example. Moreover, landmark points become occluded and invisible in the image for highly rotated head positions. Unfortunately, increasing the number of classes to represent more head rotation states requires an enormous amount of work to construct the needed database for training the local models. To manually mark enough training images to populate a comprehensive set of head rotation classes is far from cost effective or desirable, and is conventionally avoided. Conventional face tracking schemes are also slower and more complex during runtime when they are made to rely on larger working databases, more machine learning, or more training of conventional modeling schemes.

SUMMARY

Tracking units for facial features with advanced training for natural rendering of human faces in real-time are provided. An example device receives an image of a face from a frame of a video stream, and based on the image, selects a head orientation class from a comprehensive set of head orientation classes. Each head orientation class includes a respective 3D model. The device determines modifications to the selected 3D model to describe the face in the image, then projects a 2D model of tracking points of facial features in an image plane based on the 3D model, and controls, actuates, or animates a piece of hardware based on the facial features tracking points. The device can switch among a comprehensive set of 35 different head orientation classes, for example, for each video frame based on suggestions computed from a previous video frame or from yaw and pitch angles of the visual head orientation. Each class of the comprehensive set is trained separately based on a respective collection of automatically marked images for that head orientation class.

This summary is not intended to identify key or essential features of the claimed subject matter, nor is it intended to be used as an aid in limiting the scope of the claimed subject matter.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein.

FIG. 10 is a diagram of yaw and pitch angles of classes within a comprehensive set of head orientation classes.

DESCRIPTION

Overview

This disclosure describes a facial features tracker ("features tracking unit") 100 with advanced training for natural rendering of human faces in real-time. An example modeling system with advanced training produces a comprehensive set of head orientation classes. Advanced logic to take advantage of the comprehensive set of head orientation classes results in a fast runtime and high accuracy of rendered facial features in real-time.

Figure 1:
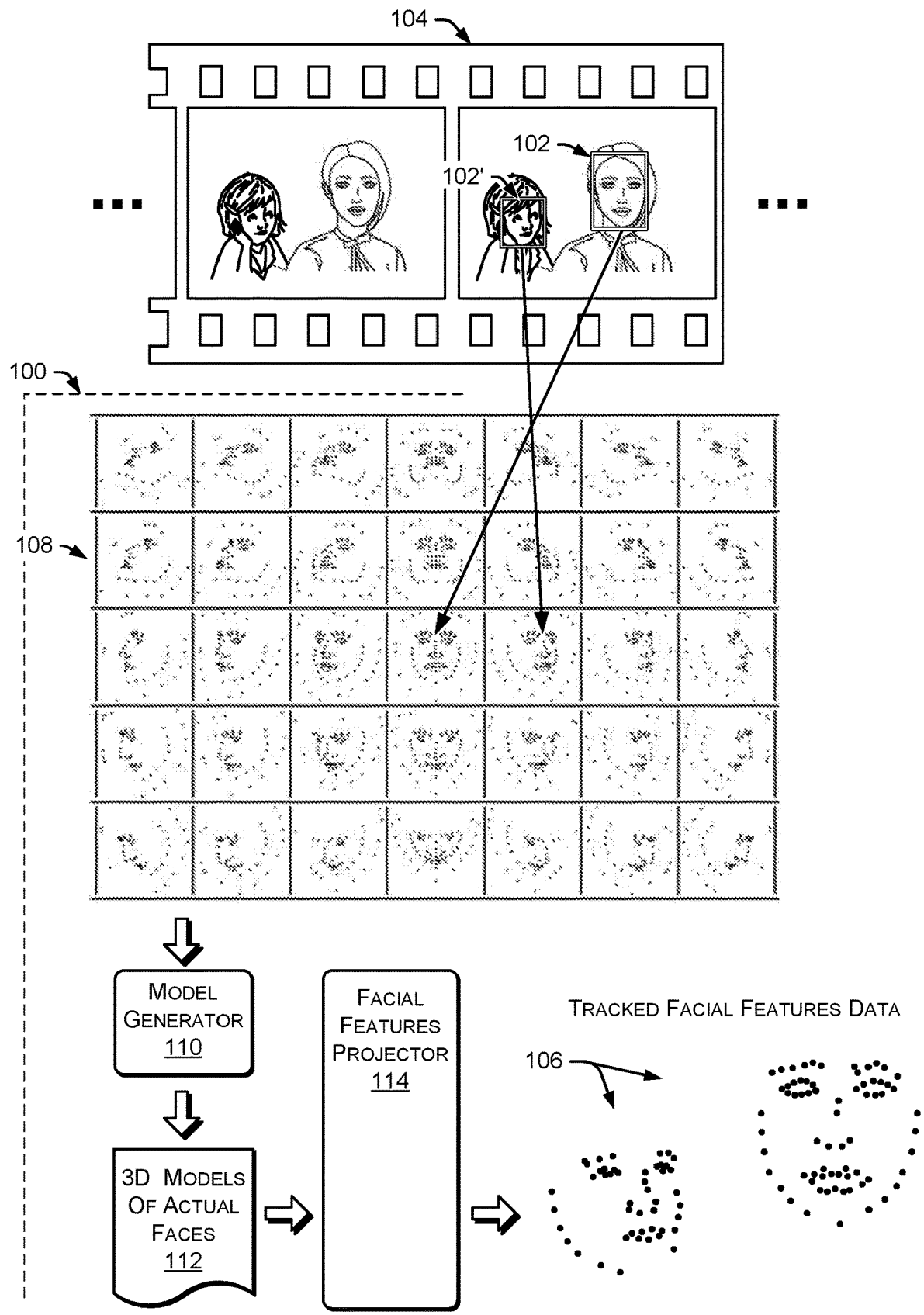
FIG. 1 is a diagram of example facial feature tracking using a comprehensive set of 3D head orientation classes.

As shown in FIG. 1, an example system 100 receives facial images 102 & 102' from each frame 104 of a video stream and projects accurate real-time 2D face modeling data 106 based on application of a large collection of head posture classes ("head orientation classes") 108, each with a respective well-trained 3D deformable head model. Each 3D deformable head model within the comprehensive set consists of feature points representing facial landmarks of an averaged human face, to which actual faces 102 & 102' are compared.

Example systems 100 provide powerful real-time facial feature tracking, because each head posture class in the comprehensive collection 108 and each associated 3D deformable head model is individually and comprehensively trained beforehand. Utilizing the comprehensive set of head orientation classes 108, an example system 100 has a model generator 110 to produce a 3D model 112 of each actual face 102 in the respective video frame 104. A facial features projector 114 creates accurate 2D tracking points 106 and other tracking data in real-time for each of the actual faces 102 & 102', based on the 3D models 112 generated from the comprehensive set of head orientation classes 108.

In an example implementation, each of 35 (for example) separate head orientation classes 108 are subjected to principal component analysis (PCA) to derive realistic axes of head motion. Each 3D deformable head model for each of the 35 separate head orientation classes 108 is modeled by a subset of an overall number of facial feature points, 107 feature points for example, used for all of the 3D head models in the set 108, in one implementation. Each of these facial feature points for each of the example thirty-five 3D deformable head models 108, in turn, is assigned a set of support vector machine (SVM) local classifiers that are trained specifically for each feature point. During modeling, each projected landmark tracking point is then specifically validated to ensure that the modeling for a given video frame 104 is valid. The resulting facial features tracker 100, as a device, provides robust natural modeling of the human face 102 & 102' that is accurate and natural, in real-time.

In an example implementation, 3D geometry of the human face 102 is learned in a manner that accounts for wide-ranging natural variations in the shapes and motions of all possible human heads. This 3D geometrical learning accounts for a wide range of natural human facial gestures. Such comprehensive 3D geometrical modeling provides an overall set of flexible 3D models 108 that can plausibly model a given human face 102 & 102' in a wide range of head and face orientations 108 as occur in the frames 104 of a live or stored video stream.

Because the set of trained 3D geometrical models 108 is comprehensive, deformation of the trained 3D models 108 to track any given face 102 & 102' can be accomplished with a reduced number of parameters compared to conventional face modeling, for example using only around 30 parameters, in one implementation, which improves the hardware functioning and power use of computing devices and video equipment. Moreover, the example facial features tracker 100 can switch between head posture classes 108 on the fly, in real-time, bringing to bear a powerful switching mechanism that changes between well-trained 3D deformable head models 108 as often as needed, even as often as changing the head orientation model 108 between each separate video frame 104, which streamlines the tracking calculations and improves the functioning of the computing hardware involved.

The example facial features tracking units 100 described herein are implemented in hardware. The example features trackers 100 may also be utilized in systems and apparatuses that use hardware components, software components, and combinations of hardware and software components.

Various hardware systems and computing devices can be improved in speed, efficiency, and overall performance using the example facial features tracking units 100 described herein. Augmented reality (AR) devices, such as AR goggles, smartglasses, and head-up displays (HUDs) in scopes, aircraft, and auto windshields can display modeled or stylized facial features or head features in real-time, derived from the live video feed of a camera using an example facial features tracking unit 100.

Real-time face tracking and recognition (RTFTR) devices, which identify faces in a video stream and match the faces against a database of known faces, can benefit from facial and head features derived from video feed using an example facial features tracking unit 100.

Virtual film production hardware with real-time facial performance capture may use machine-learning to allow fast inference of facial geometry from video streams, using an example facial features tracking unit 100.

Likewise, video-based face recognition surveillance in real-time can be made more efficient using an example facial features tracking unit 100.

Gaming hardware, in which players are given the ability to generate a character or animate an avatar's face based on their own facial motion in real-time can display modeled or stylized facial features or head features derived from the live video feed of a camera using an example facial features tracking unit 100. The example facial features tracking unit 100 can also render a tracked person's head position and facial expression, or the player's face itself, on an avatar. The facial features tracker 100 can provide a player with options to replace a generic game face with a source face, their own face, a cartoon mask, or a famous person's face, all derived from real-time facial features or head features derived from live video feed using an example facial features tracking unit 100. Gaming applications can benefit from example facial features tracking units 100 that analyze input from a camera and deduce the head pose and facial expressions, making such information available to the gaming application in real-time.

An example facial features tracking unit 100 can also provide more natural virtual cosmetics or "electric makeup," in the form of various natural colors, based on the natural rendering possible with an example facial features tracking unit 100.

For smart phones, live selfie effects and synthesis of 3D characters can use the example facial tracking units 100 to drive the 3D characters with the user's facial expressions. The example tracking units 100 can add special effects to live video. The example facial features tracking units 100 can also accurately derive real-time 3D facial features from 2D visual information captured from a monocular smart phone camera, overlaying the 3D facial features onto emoji and other visual characters and avatars. As the user contorts their expressions, the expression on the selected emoji or avatar changes with it.

The example facial features tracking units 100 can also be employed for tracking human faces in live video capture for gesture recognition in human-machine interactions. Since the example facial features tracking units 100 more accurately sense facial gestures from a more comprehensive collection of head orientation models 108, which are more highly trained than those of conventional face trackers, the example tracking units 100 may be used to increase the intelligence of human-robot interactions. Computer vision using the example facial features tracking units 100 can gain high-level understanding or high-dimensional data from subtle facial gestures available in real-time via the example facial tracking units 100.

Likewise, gesture-based interfaces, in which the user specifies commands by simple freehand movements or drawings may sometimes substitute for conventional keyboard, mouse, menu, and manipulation interfaces. The example facial features tracking units 100 can provide the capability to specify objects, operations, and parameters with intuitive gestures.

Model-based video coding that uses image processing and machine-vision may also be made more efficient with the example facial features tracking units 100. Such model-based coding techniques can provide very low bit-rate video compression when 3D models of moving facial features are able to provide the motion parameters associated with the model structure, rather than the specific face itself. The original video sequence can then be approximated using the 3D models and the motion parameters.

In general, facial motion capture devices may electronically convert the movements of a person's face into a digital database using cameras or laser scanners and the example facial features tracking units 100. The database created may then be used to produce CG (computer graphics) or CGI (computer generated imagery) to animate movies, games, and real-time avatars. Because the example facial features tracking units 100 enable the motion of characters to be derived from the movements of real people, the generated imagery is more realistic and nuanced than if the animation were created by conventional trackers.

Example Systems

Figure 2:
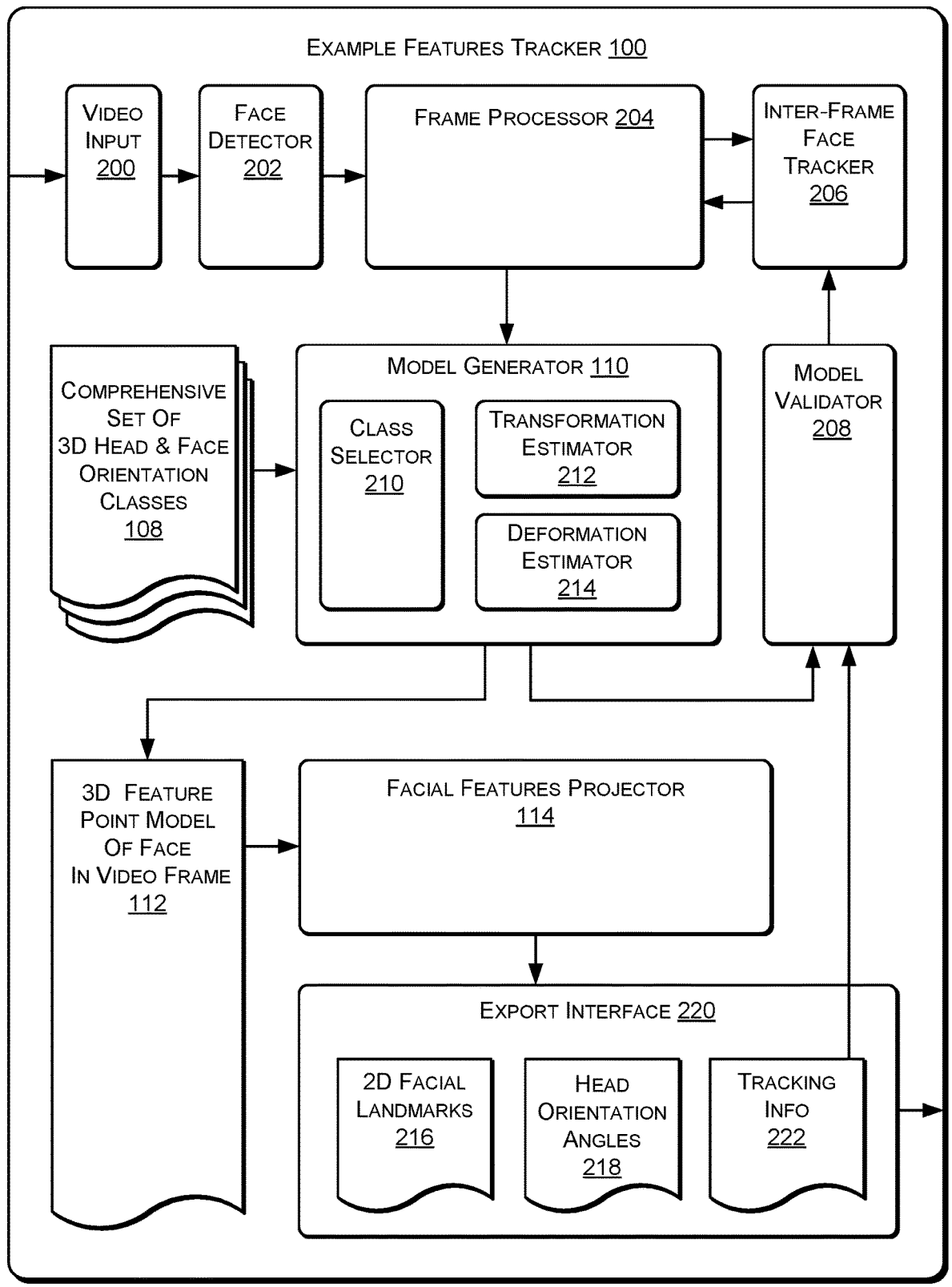
FIG. 2 is a block diagram of an example features tracker.

FIG. 2 shows an example facial features tracking unit ("features tracker") 100. The example features tracker 100 may reside in its own device hardware, or in the hardware of devices described above.

In an implementation, the example features tracker 100 includes, among other hardware and components, a video input 200 for receiving a video stream with individual video frames 104 to be processed by the example features tracker 100. A face detector 202 locates each visual part of an image within a video frame 102 that represents a face 102, and returns a bounding box location of each face 102 & 102' to a frame processor 204 of the example features tracker 100. The face detector 202 may also return rough head orientation estimates and other data to the features tracker 100.

The frame processor 204 manages operations for each individual video frame 104, and increments the processing to subsequent video frames 104. An inter-frame face tracker 206 keeps track of both initial face data and also processed face data (for example, final tracking info 222) for each face 102 & 102' in a given video frame 104 for purposes of continuity between video frames 104, and for providing a head start for the processing of subsequent video frames 104 when the subsequent video frames 104 are determined to contain the same face 102 or faces 102 & 102' as the video frame 104 just processed.

In an implementation, the inter-frame face tracker 206 uses input from a model validator 208 to decide whether the most recently generated models 112 were valid for the faces 102 & 102' of the most recent video frame 104, and if not, then the inter-frame face tracker 206 calls for new models 112 to be generated. Likewise, the face detector 202 may sense a new face in the next video frame 104, or a newly unrecognized face, which also triggers computation of new models 112, rather than re-use of the models 112 generated for the last video frame 104.

The comprehensive set of 3D head (and face) orientation classes 108 introduced above, for example 35 different classes 108, will be described in more detail further below in the description.

The model generator 110 includes a class selector 210, which selects a head orientation class 108 for each face 102 & 102' in a video frame 104. The class selector 210 may switch the head orientation class 108 for a given face 102 as often as each video frame 104. The model generator 110 also includes a transformation estimator 212, which determines the rotation, scaling, and translation parameters for obtaining a 3D feature point model 112 of the visual face 102 in the video frame 104 from the selected 3D model of the head orientation classes 108, which is an averaged and generic 3D model. Likewise, a deformation estimator 214 determines warpage parameters to obtain specific gestures of the visual face 102 in the video frame 104 given the averaged and generic 3D model associated with the selected head orientation class 108. In an implementation, the model generator 110 finds transformation parameters and deformation parameters needed to go from the actual visual face 102 to the generic 3D model of the head orientation class 108. But in another implementation, an example transformation estimator 212 and example deformation estimator 214 can calculate from the generic 3D model 108 to landmarks of the visual face 102 in the video frame 104.

Once the model generator 110 creates the 3D feature points model 112 of a specific face 102, the facial features projector 114 computes feature points, also referred to at this stage as tracking points because of their utility in practical hardware applications, in a useful 2D image plane for use on the hardware of a device, such as a flat display or animator hardware. In an implementation, a version of the facial features projector 114 may maintain 3D data for export of 3D tracking points to be used in a 3D space, such as for rendering the face 102 and/or head as a hologram or other 3D projection in 3D space.

The facial features projector 114 generates at least 2D facial landmarks 216, head orientation angles 218, and tracking information 222 for at least the purpose of updating the tracking of a given face 102 through multiple video frames 104 via the inter-frame face tracker 206. The facial features projector 114 can also compute information regarding eye pupil location, eye socket location, eye status (for example open or closed), gaze direction, mouth status (open or closed), and fatigue level.

An export interface 220 transmits the 2D facial landmarks 216, head orientation angles 218, and tracking information 222 to device hardware. In an implementation, the export interface 220 outputs 3D tracking points for 3D display of facial features.

Example Operations

The example features tracking unit 100 works on video sequences received at the video input 200 and utilizes data from the face detector 202, which provides a bounding box and a rough head orientation for each new face 102. The features tracking unit 100 outputs coordinates of selected facial landmarks 216 and also determines head orientation angles 218 of each face 102 & 102' being tracked in each frame 104 of the video sequence. In an implementation, face detection 202 is needed only for the first occurrence of each face 102 & 102', as the inter-frame face tracker 206 tracks same faces 102 & 102' in subsequent video frames 104.

The example features tracking unit 100 provides for each face 102, in each frame 104, head orientation angles 218 and a set of facial landmarks 216, with initial 3D coordinates 112 expressed relative to a defined sensor coordinate system. The orientation angles 218 are orientation angles of the head associated with the facial landmarks 216, considering that a 3D model 112 of the whole head is approximated by the model generator 110, given the face 102 observed in the image of the video frame 104.

Figure 3:
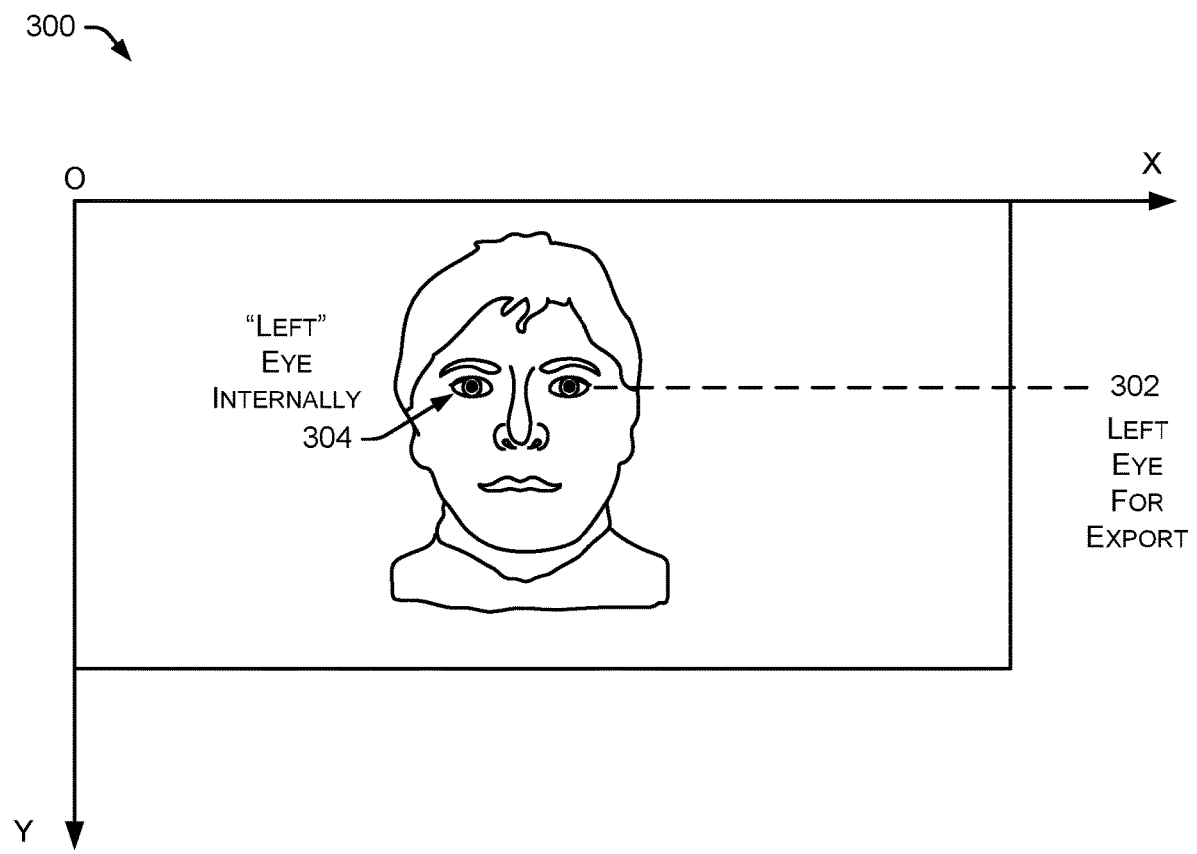
FIG. 3 is a diagram of an example right-side and left-side convention for internal operations of the example features tracker.

FIG. 3 shows an example image coordinate system 300. The example features tracker 100 can output 2D coordinates 216 of different landmarks, expressed relative to a defined image coordinate system 300. In an implementation, an origin point "O" is the top-left corner of a 2D image. The example features tracker 100 exports eye 302 as the left eye, but internally the example features tracker 100 may designate the eye 304 on the viewer's left as the "left" eye.

Figure 4:
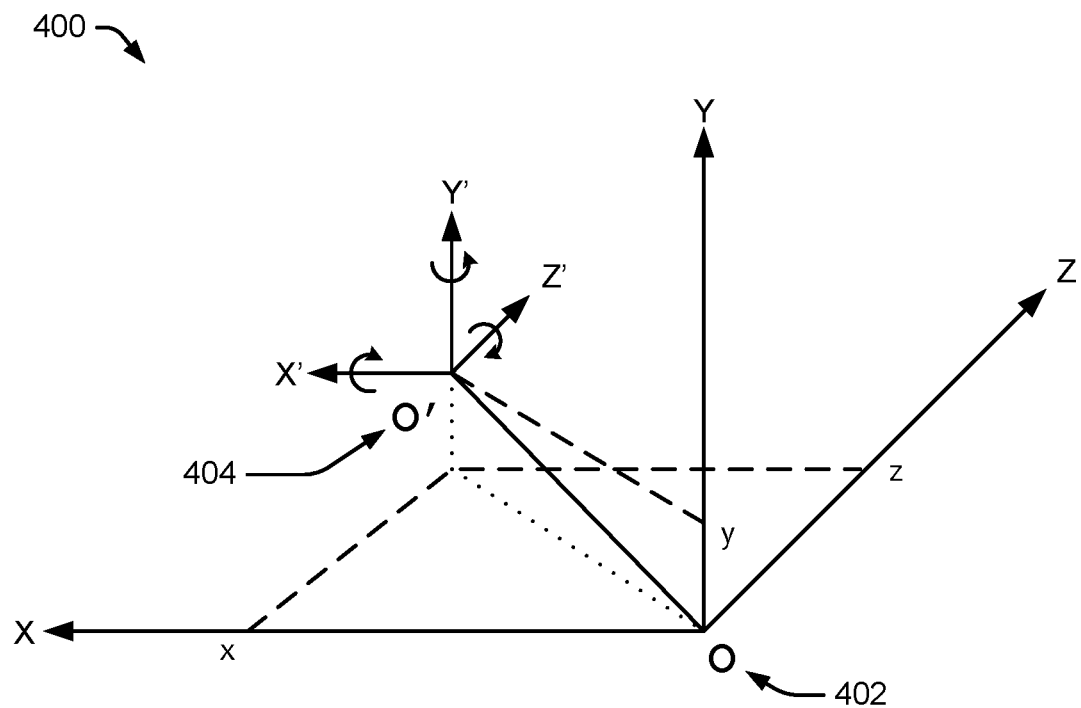
FIG. 4 is a diagram of an example sensor coordinate system for 3D space using a camera point of view.
Figure 5:
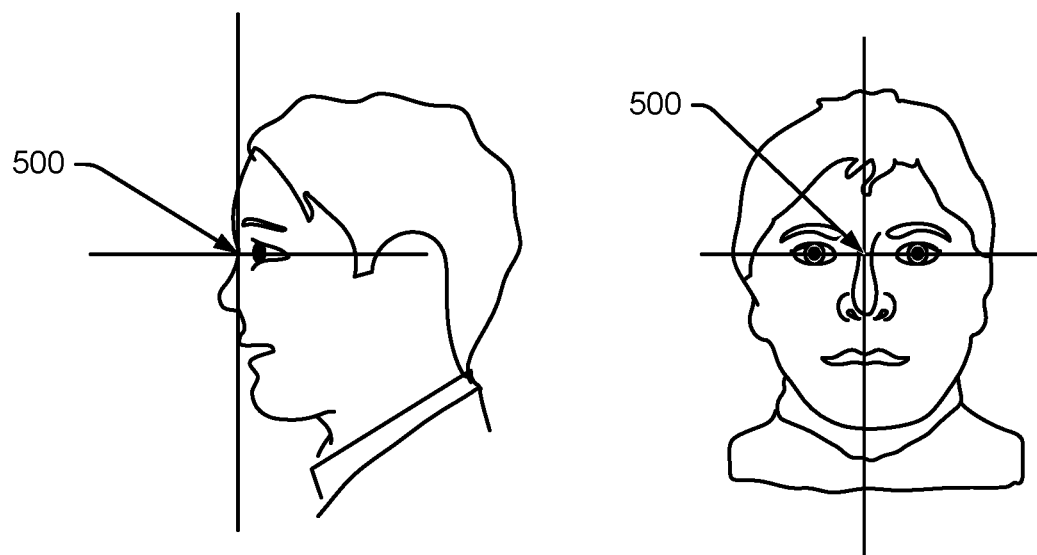
FIG. 5 is a diagram of an example reference point for head location defined on the bridge of the nose for visual faces in video frames.

In contrast to the image coordinate system 300, FIG. 4 shows an example defined sensor coordinate system 400 for 3D space. The origin point "O" 402 is the center of the image sensor or reference camera, and the point O' 404 is the point defining the head position. The head position can be defined as a head weight center, and in an implementation, specifically defined as a head reference point 500 on the nose bridge, as shown in FIG. 5.

Figure 6:
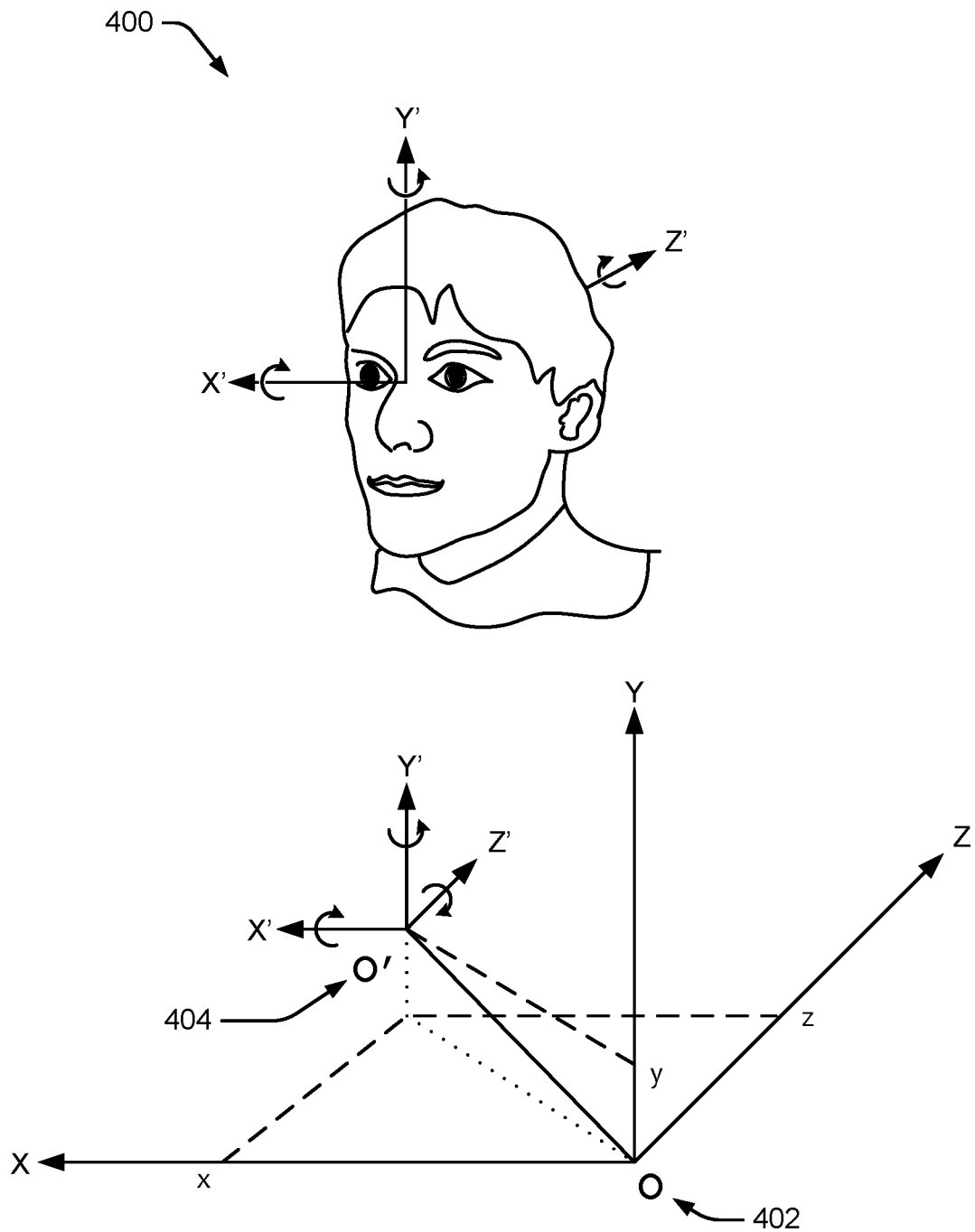
FIG. 6 is a diagram of the sensor coordinate system of FIG. 4 applied to a visual head and face with origin at the reference point for head location defined in FIG. 5.
Figure 7:
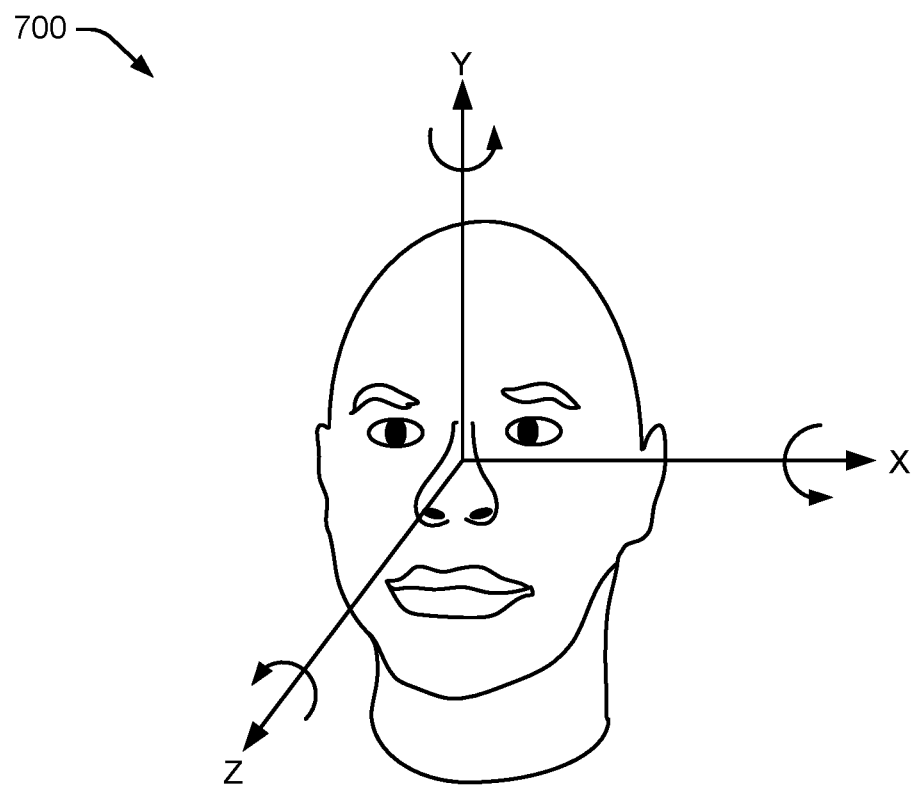
FIG. 7 is a diagram of an internal image coordinate system for feature tracking in 3D space, with axes of the coordinate system of FIG. 4 inverted around the y axis to provide the internal image coordinate system.

In FIG. 6, in an implementation, the example features tracker 100 provides head orientation angles as a triplet (roll, yaw, pitch), such as Tait-Bryan angles. Roll is rotation around the shown z axis, yaw is rotation around the y axis, and pitch is rotation around the x axis. Hence, the head orientation angles 218 may be defined according to a right hand rule, in the defined coordinate system 400. Internally, however, a given implementation of the example features tracker 100 may follow different rotation conventions, and may operate internally as shown in FIG. 7, with a reference coordinate system 700 rotated 180° about the y axis, as compared with the sensor coordinate system 400 of FIGS. 4 and 6.

The example features tracker 100 provides a solution for identifying head orientation angles 218 and image locations of predefined facial landmarks 216 using the large, comprehensive set of head orientation classes 108. Based on this main information, the example features tracker 100 may further compute other different features as above, such as eye pupil location, eye socket location, eye status (open or closed), gaze direction, mouth status (open or closed), and fatigue level.

For a given face 102 (detected using the face detector 202), the example features tracker 100 computes all the desired information using a 3D representation 108 of an average human head, which is further rotated, scaled, translated and deformed such that its projection in an image plane matches the face 102 observed in the image of the video frame 104. The operations of rotation, scaling, and translation of the 3D model 108 are referred to herein as transformations, while the rotation angles, scaling factors, and translation factors are referred to as transformation parameters. The deformations, on the other hand, are responsible for changing the shape of the head and applying various gestures.

In an implementation, the number of deformation directions used by the deformation estimator 214 is pre-computed, and the computational logic associates a deformation parameter with each of the computed directions in order to match the currently observed face 102. The processing of each frame 104 of the video stream includes estimation of the transformation and deformation parameters, from which the facial features projector 114 extracts head orientation angles 218 and computes the facial landmarks 216 (thereby projecting the 3D model 112 on a 2D image plane). The match between the projected 3D model 112 and the face 102 observed in current image 104 can be measured by local evaluation of each of the locations of the facial landmarks 216, or feature points, using a classification model that features a histogram-of-oriented-gradients or HOG-based descriptor. The HOG-based descriptor is a feature descriptor used in computer vision and image processing for the purpose of object detection, which counts occurrences of gradient orientation in localized portions of an image based descriptor.

Example 3D Models

In an implementation, the example features tracker 100 operates with averaged 3D models 108 of the head, with facial landmarks represented by feature points at average positions, on which is applied a set of transformations to match a 3D model 108 to the head of the subject face 102 in the current image 104. Not all facial landmarks are visible in all angles of head orientation. For example, a side profile of the face only shows one eye. In an implementation, the example features tracker 100 operates with a set of 35 head orientation classes, each with its own set of visible facial landmarks, providing powerful accuracy to facial features tracking.

In an implementation, a database of 3D models of human heads 108, such as the set of 35, is artificially generated using a modeler, such as a FaceGen modeler, for example (Singular Inversions Inc., Toronto, Calif.). The models are internally stored in the reference coordinate system 700, rotated 180° about the y axis as shown in FIG. 7, as compared with the sensor coordinate system 400 of FIGS. 4 and 6. Each 3D model 108 is centered on the defined head reference point 500 (FIG. 5), selected in one implementation as a point on the nose bridge. In an implementation, the models 108 are scaled such that the interpupillary distance is 63 mm, which is the average distance for an adult person.

The database of 3D models 108 displays different head shapes and gestures, enabling the computing of main deformation directions. In an implementation, each model 108 is defined by a set of 107 points in 3D space ("3D points"), representing selected facial landmarks. Internally, in an implementation, the 3D points may also be grouped in categories, depending on which facial feature they belong to. Some features are divided into multiple components (for example, the jaw) for convenience.

Figure 8A:
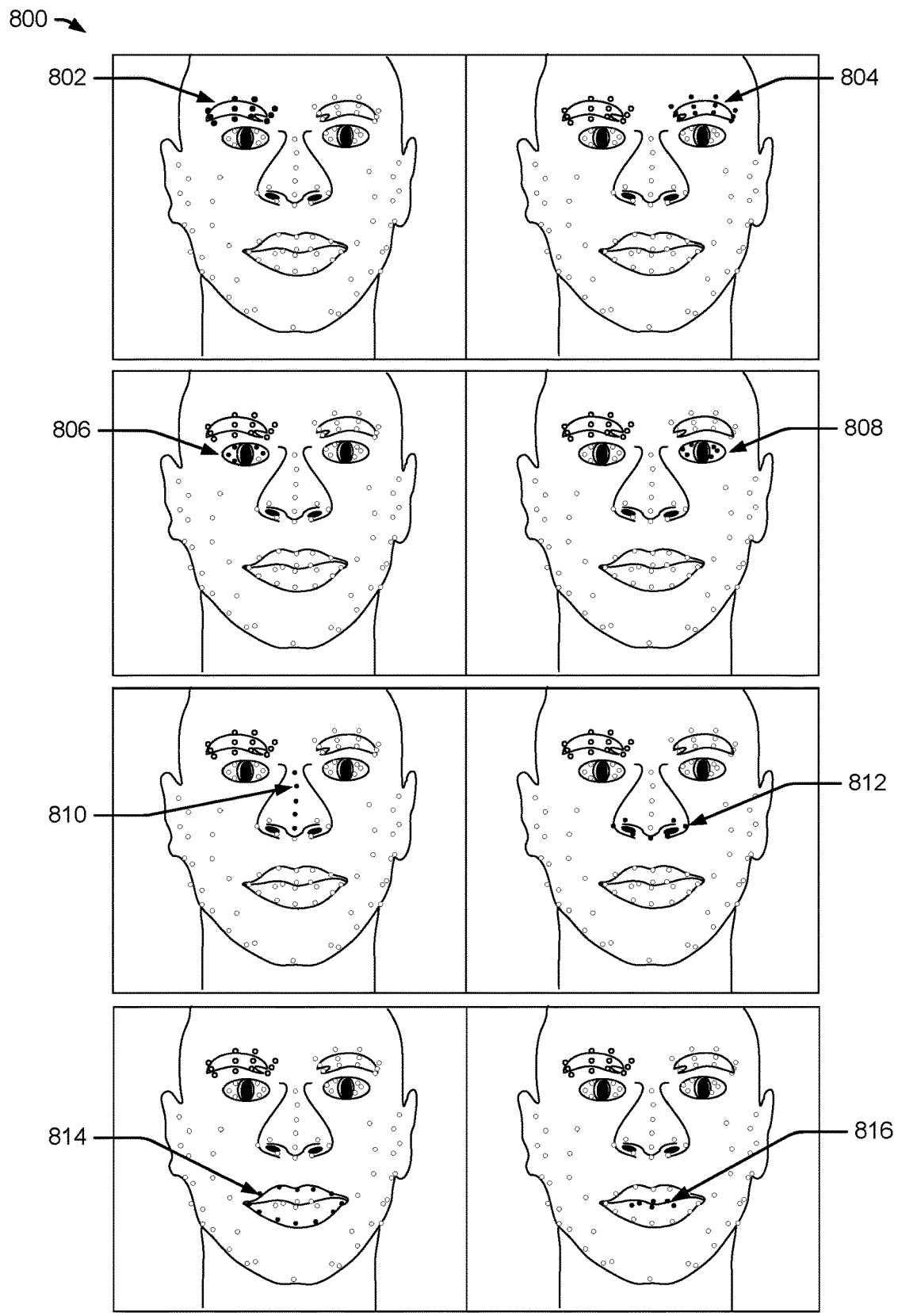
FIG. 8A is a diagram of example feature point groups representing eye, nose, and mouth facial features.
Figure 8B:
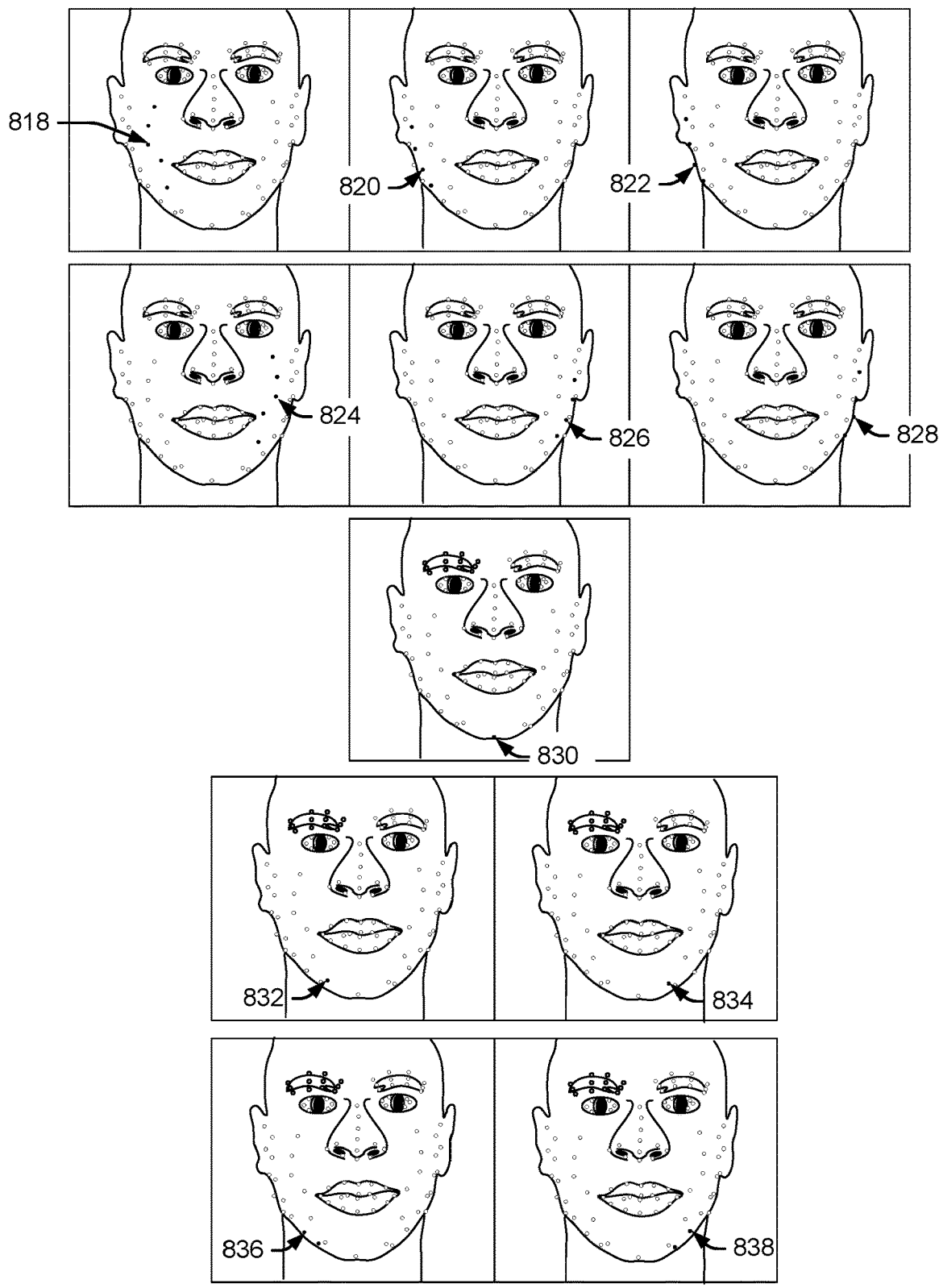
FIG. 8B is a diagram of example feature point groups representing jaw and chin facial features.

FIGS. 8A-8B show defined facial feature groups, and example feature points representing the respective facial landmarks group. In an implementation, a frontal face orientation of a 3D model from the set of head orientation classes 108 shows all the feature points at once. But not all points are utilized in all head orientations. Rather the most relevant feature points are included for a given head orientation (for example, referring to jaw and chin features), reduced further in number by including only the feature points visible from the camera view 402.

In FIG. 8A, the modeled feature points may be grouped internally using the image coordinate system shown in FIG. 3, into a left eyebrow 802, a right eyebrow 804, a left eye 806, a right eye 808, a nose bridge 810, a nose base 812, an outer mouth 814, and an inner mouth 816, for example.

Continuing in FIG. 8B, the modeled feature points may be grouped internally using the image coordinate system shown in FIG. 3, into a left inner jaw line 818, a left middle jaw line 820, a left outer jaw line 822, a right inner jaw line 824, a right middle jaw line 826, a right outer jaw line 828, a chin 830, an extended chin inner left 832, an extended chin inner right 834, and extended chin outer left 836, and an extended chin outer right 838, for example.

Figure 9:
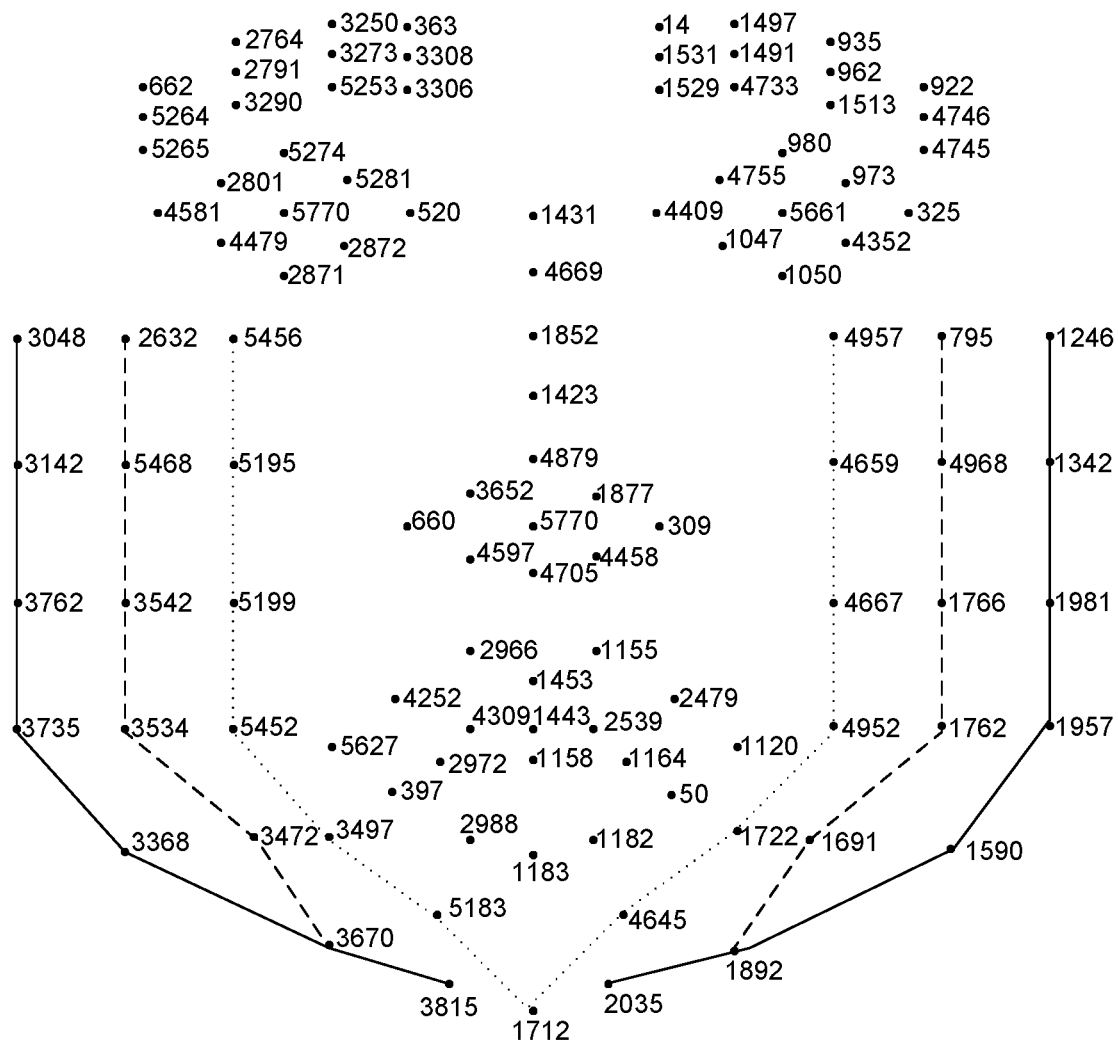
FIG. 9 is a diagram of a complete set of facial feature points with identities used internally by an example features tracker.

FIG. 9 shows an example internal layout of facial feature points, as used in the 3D models of the comprehensive set of head (and face) orientation classes 108. Each facial feature point landmark has a unique identifier, the unique identity of that point for internal processing in the example features tracker 100. Subsets of the feature points are used internally by the example features tracker 100 to map the various facial features shown in FIG. 8A-8B.

Figure 11:
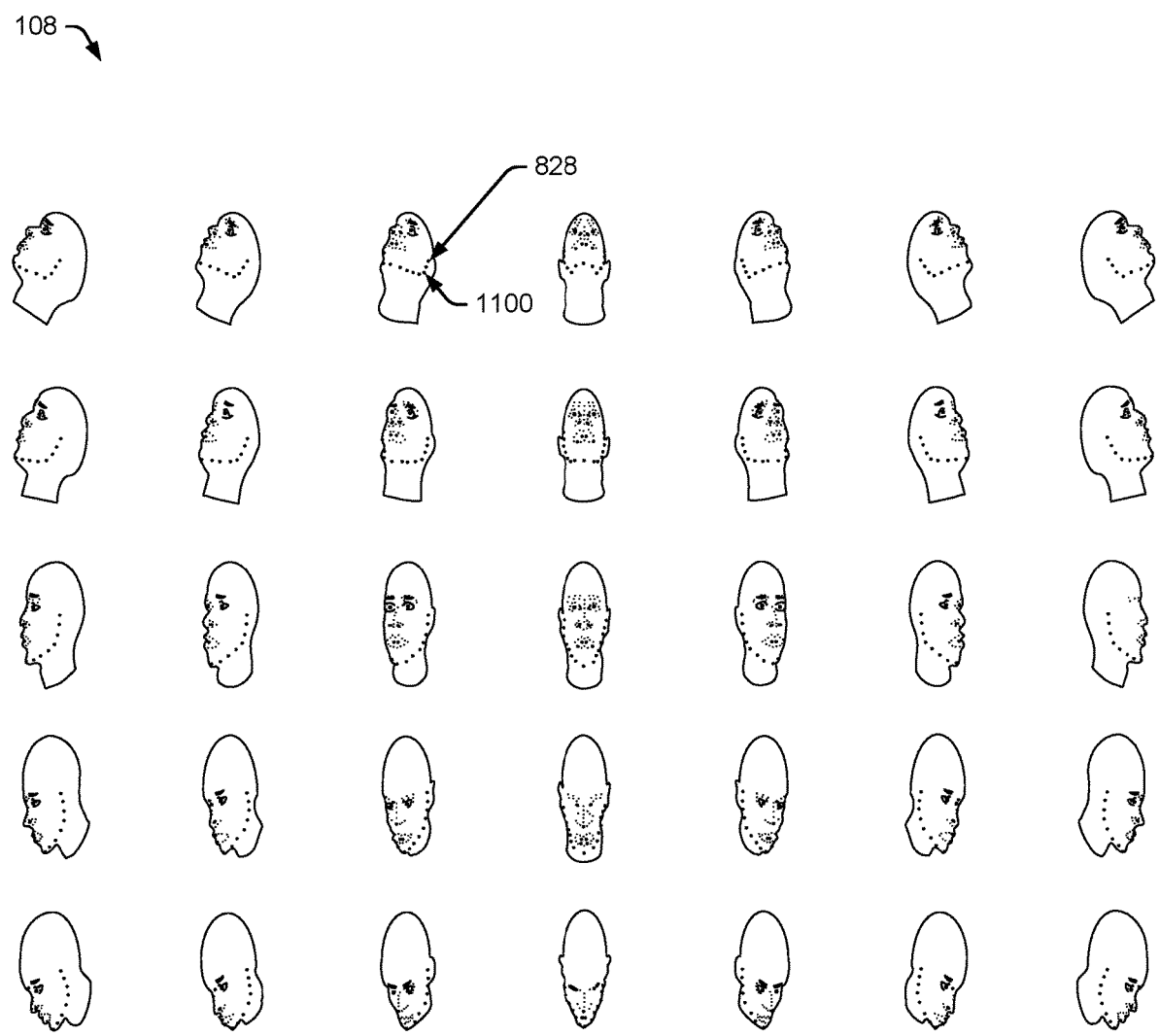
FIG. 11 is a diagram of visible feature points for each head orientation class of the comprehensive set of head orientation classes.
Figure 12:
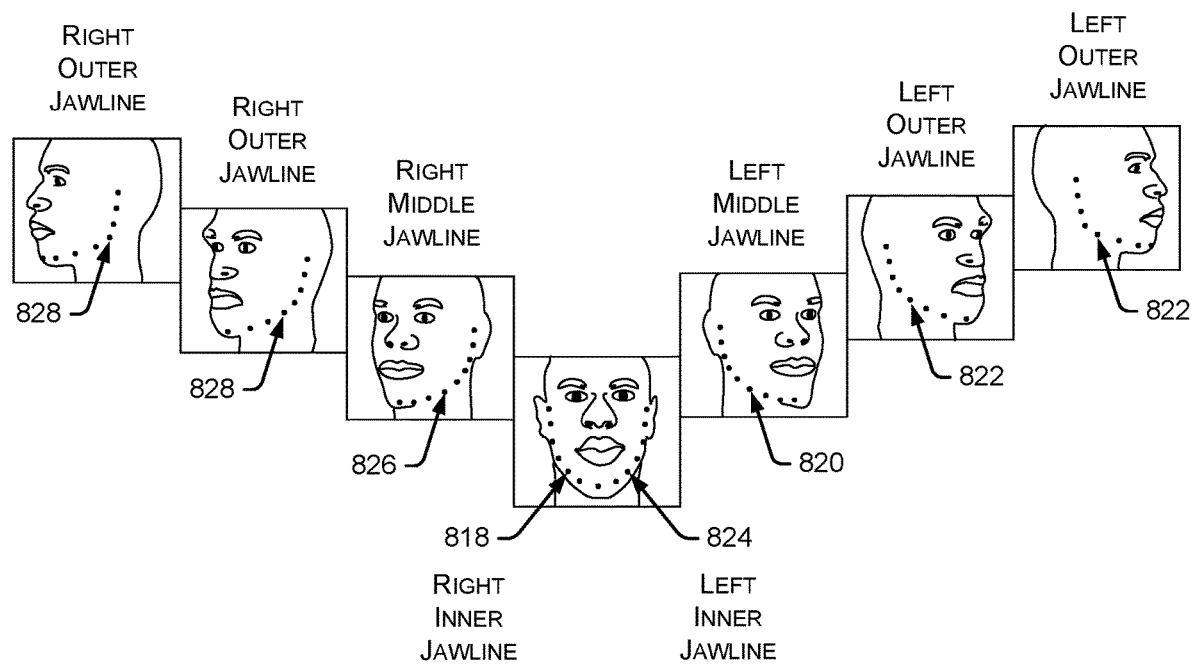
FIG. 12 is a diagram of example visual transitions between different head orientation classes having different yaw angles, demonstrating the utility of three different lines of defined jaw points on each of the right side and left side at the different yaw angles.

FIG. 10 defines, in one implementation, the 35 example head orientation classes 108 and their corresponding yaw 1002 and pitch 1004 head orientation angle ranges in degrees, in view of an internal rotation convention. In each of the head orientation classes 108, only a subset of the total 107 facial landmark feature points are relevant for the respective head orientation, due to occlusions or redundancy. In an implementation, the number of head orientation classes 108, for example the 35 classes, is selected to provide enough orientation classes for smooth transitioning between subsets of the total landmark points when head orientations change between video frames 104, FIG. 11 shows visible feature points, for example feature point 1100 in right outer jaw line 828, utilized for each head orientation class of the comprehensive set of head orientation classes 108. For each class, the subset of visible/relevant points is defined, each feature point being specified using its unique identifier as shown in FIG. 9. Feature points that are not visible from the camera view 402 can be omitted from each class 108 to which this lack of visibility applies, for example some classes lack feature points that are part of the following facial features, depending on the head orientation angles of that class: left eyebrow 802, right eyebrow 804, left eye 806, right eye 808, nose bridge 810, nose base 812, inner mouth 816, and outer mouth 814, for example. Regarding jaw feature points, in an implementation three lines of jaw points are defined for each side, such that the example features tracker 100 can switch between them depending on head orientation: for the left side, jaw lines 818, 820, & 822 (FIG. 8B), and for the right side, jaw lines 824, 826, & 828 (FIG. 8B). Three lines of jaw feature points are used because if only one set of jaw points is used, then these limited points would be visible only in a limited range of head orientation angles. FIG. 12 shows examples of the visual transitions between different head orientation classes having different yaw angles, demonstrating the usefulness of having the three lines of defined jaw points on each of the right side (818, 820, 822) and left side (824, 826, 828) at the different yaw angles. Right and left are assigned according to the convention of FIG. 3.

Example Templates

The comprehensive set of 3D head orientation classes 108, stored in a database for example, may contain additional information that accompanies the 3D face models inherent in the set of head orientation classes 108. Some of the class information to be used by the model generator 110 can be pre-computed and made available in data structures that accompany the set of 3D head orientation classes 108.

In an implementation, the pre-computed information may be provided in templates, files, headers, or other data structures. For example, in an implementation, there are three main types of data headers. A first header may contain general constants and data structure definitions. The constants defined in this header may be general and apply to the entire set of head orientation classes 108, since they are not directly associated with a specific head orientation class. The data structures defined in this header can be used to describe information associated with every head orientation class, for example, a data structure may be used for centralization of the information exported for any of the head orientation classes 108.

There is also class-specific information. For each head orientation class 108, an additional header may be defined, named after the associated class. This header contains a set of buffers that can be used to define the specific data structure associated with the head orientation class. For example, the defined data structure can include:

A general information section, with fields such as "type," "name," "location," and "neighbors." Initial data fields can specify general information of the particular face class 108, such as its name or the position of the class relative to other classes, considering yaw and pitch angles, as shown in FIG. 10.

A display classes section may be included in the pre-computed information of the 3D head orientation classes 108, with a field such as "displayClasses." In an implementation, an outputted set of the facial landmarks 216 may be completed with feature points from a neighbor class that was previously the current head orientation class 108. This operation is performed when head orientation angles oscillate between two neighboring head orientation classes 108, which can cause some feature points to appear and disappear between frames 104, because some feature points are visible in one class 108 but not in the other. So this field in the data structure may be utilized as a buffer containing information about head orientation classes 108 with feature points that can be displayed in addition to feature points of the current head orientation class 108.

A head orientation ranges section may be included in the pre-computed information of the 3D head orientation classes 108, with fields such as "yawRange," and "pitchRange." These fields define the ranges of yaw and pitch angles associated with a current head orientation class 108.

A display ranges section may be included in the pre-computed information of the 3D head orientation classes 108, with fields such as "displayYawRange," and "displayPitchRange." These fields can define the ranges of yaw and pitch angles for the feature points of the head orientation class 108, especially useful when a head orientation places the head in a neighbor class of the current class, and the current class was the previous head orientation class 108 of the tracked face 102.

A feature points model section is included in the pre-computed information of the 3D head orientation classes 108, with the field "featurePointsModel." This data structure stores the set of feature points associated with the current head orientation class 108. These feature points define the 3D model for the current head orientation class 108. For each such feature point, information is stored about its identity, the type of facial feature the feature point represents, the classification model it belongs to for purposes of the main tracking functions and validation functions, and associated deformation information.

A validation model section may be included in the pre-computed information of the 3D head orientation classes 108, with the field "fcheck." After computing the 3D model associated with one video frame 104, validation logic is applied by the model validator 208, which checks whether the provided set of facial landmarks 216 is a valid model. The validity is computed at the feature point level, and then the entire model 112 is considered to be valid if the percent of validated feature points is above an imposed threshold. The validity of an individual feature point can be decided by evaluation of a classification model, at the location of the feature point, in a warped image of the face 102. The face 102 is warped such that the warped face maps the feature points distribution of the averaged face associated with the current head orientation class 108. A field is allotted to store all information needed for computing the warped face image, namely, the mean coordinates of feature points on the averaged face, indexes of the points that are used to form a border around the face, and triangulation associated with the set of points. The classification models using each feature point may also be stored in a designated data structure.

A deformation model section may be included in the pre-computed information of the 3D head orientation classes 108, with the fields "nPCAPoints," "nPCAEigenvalues," "evalues," and "elimit," for example. The current head orientation class 108 has an associated set of feature points that define the 3D model 108 of the head at the associated orientation angles 218. In an implementation, this number is defined by a designated field nPCAPoints and coincides with the number of visible facial landmarks 216. In light of this, a given 3D model 108 is a point in a (3*nPCAPoints) dimension. Using PCA (Principal Component Analysis), the example features tracker 100 may select a set of principal deformation directions, as first nPCAEigenvalues eigenvectors, in descending order of the eigenvalues. The field "evalues" can store the eigenvalues and "elimit" stores the imposed deformation limits (the threshold for the absolute values of the deformation parameters).

The deformation directions may be specified as vectors with 3*nPCAPoints values. In light of how they are computed, the example features tracker 100 associates each three elements of an eigenvector, with a specific 3D point of the model. Consequently, each feature point has associated with itself a set of nPCAEigenvalues 3D points, each a part of a deformation direction. In a data structure, the field PCA POINT contains the 3D position of the feature point in the averaged 3D model 112, for example, along with the information associated with deformation directions (a buffer of 3D points).

A blink information section may be included in the pre-computed information of the 3D head orientation classes 108, with the fields "blinkLeft," and "blinkRight," for example. A blink detector is based on a classification model that evaluates an eye crop and specifies whether the eye is open or closed. The header contains two classification models (for left and right eye), which are two SVMs.

A gaze information section may be included in the pre-computed information of the 3D head orientation classes 108, with the field "gazeData." A gaze detector can approximate the gaze direction using a neural network. A buffer can be provided with two elements, each being the neural network trained for a specific right or left eye.

A general header may also be included in the pre-computed information of the 3D head orientation classes 108. This header is included in all the other headers and can define the list of face classes, as a buffer of facial data structures.

Example Flow of Operations

Figure 13:
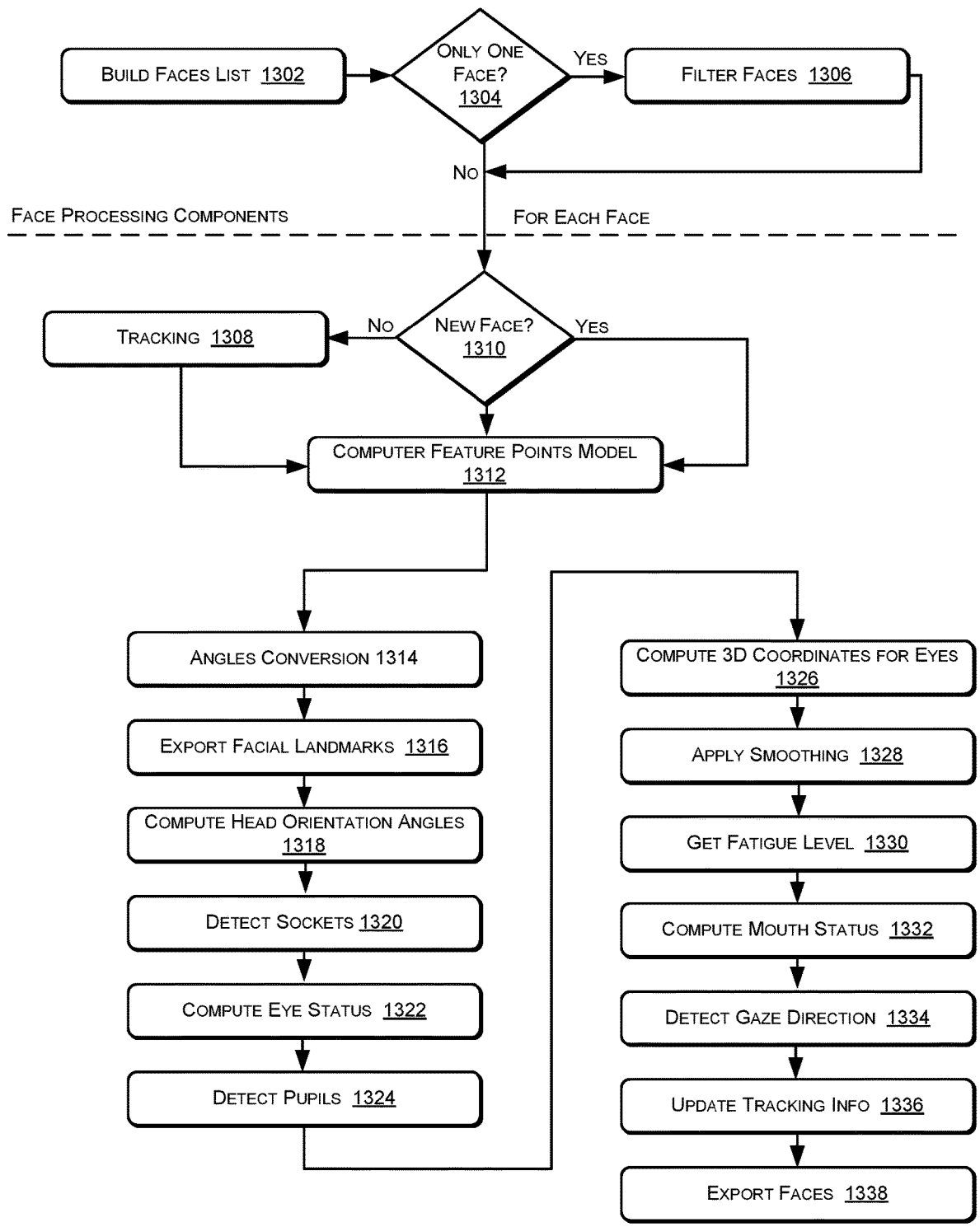
FIG. 13 is a flow diagram of an example workflow process of the example features tracker.

FIG. 13 shows an example operational workflow process 1300 of the example features tracker 100. In FIG. 13, operations of the example workflow process 1300 are shown as individual blocks. The example process 1300 introduces example steps performed when a device that uses facial features tracking makes a face detection call, for example. The example process 1300 demonstrates operational features of the example features tracker 100, demonstrating operations that are put into play for processing one face. For clarity, this description omits actions performed when an invalid face model is generated (invalid feature points model 112) or when one of the operations fails. For invalidation of a model 112, the example features tracker 100 continues processing the current face 102 for a defined fixed number of subsequent video frames 104, but exports data from a previously valid feature points model 112.

At block 1302, a list of faces 102 & 102' is built. At the beginning of each video frame 104, the example features tracker 100 has access to two sets of faces, a set of tracked faces (222) from previous frames 104, and a set of detected faces 102 & 102', from the face detector 202. During this step, a union of these two sets may be performed.

At block 1304, each face 102 & 102' is specified by a face bounding box. A component such as the example frame processor 204 may determine that two faces, from different sets, are the same face if their bounding boxes intersect. If so, the frame processor 204 keeps the face from the tracked faces set if its confidence score is greater than a threshold, otherwise the frame processor 204 keeps the newly detected face from the face detector 202 (this circumstance can be considered a reset of the face model 112 and model generation process). The confidence of a face 102 is a confidence in the associated computed model 112. Any of the faces 102, from the set of faces provided by the face detector 202, with an associated bounding box that does not intersect the bounding box of a previously tracked face 102, is added to the final set of faces as a new face 102.

At block 1306, the example frame processor 204 or other component filters the list of faces from step 1302. By default, the frame processor 204 filters the list of faces computed in previous step 1304, keeping only one face among duplicates, which is further processed. In an implementation, the largest face among duplicates, or the central face is selected for processing in the case of equal sizes.

At block 1308, a component such as the example inter-frame face tracker 206 tracks faces between video frames 104, by providing displacement of facial feature points between frames 104.

At block 1310, tracking between frames 104 by the inter-frame face tracker 206 is not performed for a face newly detected by the face detector 202.

At block 1312, the model generator 110 computes the feature points model 112 for the current face 102. Computing the feature points model 112 has many operational steps, described in greater detail in an additional process flow described below. These operations are responsible for approximating the transformation and deformation parameters of the 3D model 112 based on the comprehensive set of 3D orientation classes 108. In light of the face 102 observed in the image 104, tentative head orientation angles 218 are estimated and a set of 2D facial landmarks 216 are generated. The model validator 208 may also simultaneously compute a model confidence during these operations.

At block 1314, the estimated head orientation angles 218 computed by the previous operations 1312 (computing the feature points model 112) may be converted. Roll and pitch angles may also be inverted, to follow the coordinate system convention introduced in FIG. 7.

Figure 14:
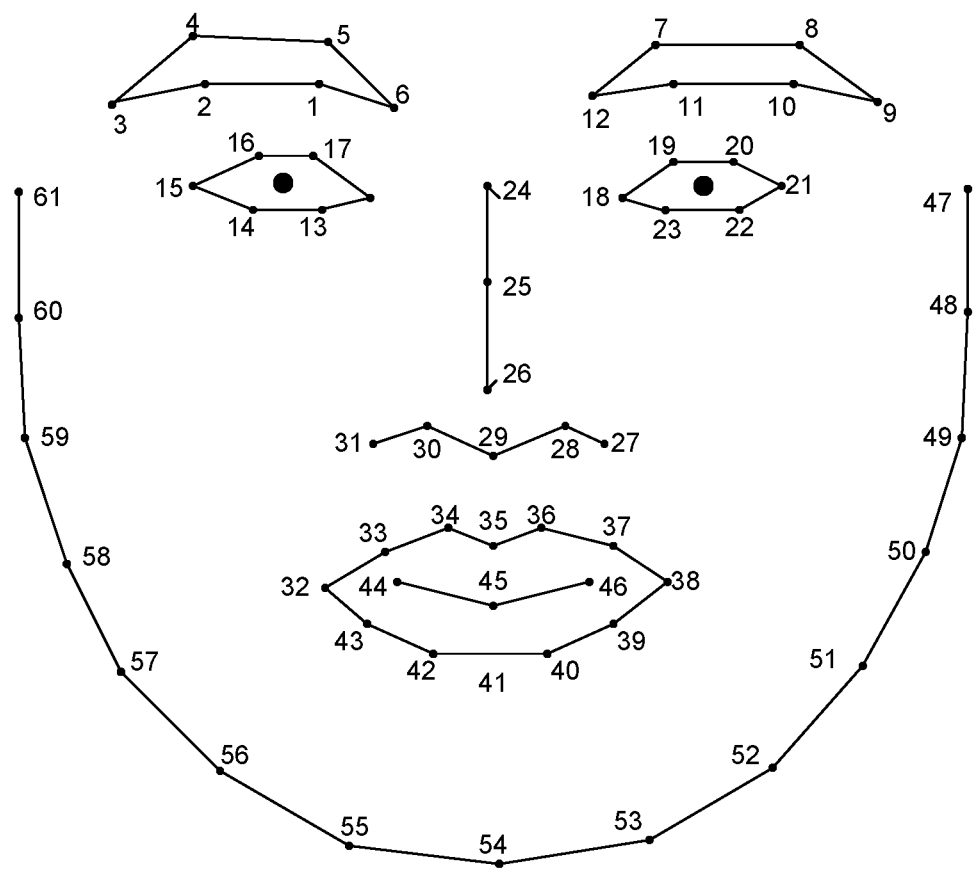
FIG. 14 is a diagram of facial landmarks exported as tracking points.

At block 1316, facial landmarks 216 are computed by the facial features projector 114 from the 3D feature points model 112, for exportation 220. In an implementation, these facial landmarks 216 do not have the same identity as the facial landmarks used internally, as shown in FIG. 9. In an implementation, the facial features projector 114 exports features points 216 according to the mapping of tracking points 1400 defined in FIG. 14, for example. In order to compute the exportable tracking points 1400, a correspondence between internal feature point identities (FIG. 9) and the external tracking points 1400 is defined. If the correspondent of a point defined in FIG. 14 is not visible in the current head orientation class, the corresponding tracking point may be designated as not available. During this step 1316, the set of facial landmarks 216 with feature points of an additional display class can also be completed.

At block 1318, the head orientation angles 218 estimated during the operations of step 1312 "compute feature points model," are now updated by a component such as the facial features projector 114, which computes the real or final head orientation angles 218 based on the generated feature points model 112 for the actual face 102.

At block 1320, a component such as the example facial features projector 114 may compute the eye socket location, for example as the center of a bounding box defined by a subset of the eye feature points 806 or 808. The selected feature points are the central ones, and their identities can be specified in designated buffers for the right and left eyes.

At block 1322, an open-or-closed eye status of each eye may be computed by the example facial features projector 114.

At block 1324, 2D locations of the eye pupils may be computed by the example facial features projector 114.

At block 1326, the 3D coordinates of the eye points (socket and especially the pupils) can be computed by the example facial features projector 114. For example, in the coordinate system of FIG. 6, the 3D coordinates for a given point are presented. In an implementation, s is a scaling factor, $(x_{3D}, y_{3D}, z_{3D})$ are 3D coordinates, $(x_{2D}, y_{2D})$ are coordinates in an image plane in the defined coordinate system, and $(x_{head}, y_{head}, z_{head})$ are the head position in a coordinate system defined for this task. The values $(detCenter_x, detCenter_y)$ provide the image center, and $avg_z$ is the average z coordinate of the eye feature points, in light of the head orientation angles 218 updated in the model 112 from operation 1318 above. These equations then provide the 3D eye points:

$$\begin{cases} x_{3D} = \dfrac{(x_{2D} - detCenter_x)}{s} \\ y_{3D} = \dfrac{(detCenter_y - y_{2D})}{s} \\ z_{3D} = z_{head} - avg_z \end{cases}$$

At block 1328, a smoothing technique may be applied to the coordinates of eye sockets and eye pupils, head position, and head orientation angles 218. For a working variable, one smoothing scheme keeps a history of the deltas (displacements) between two consecutive frames 104. The current frame 104 has the value smoothed based on the predicted displacement. The predicted displacement may be computed from a weighted average of the stored displacements.

At block 1330, a fatigue level may be computed by the example facial features projector 114.

At block 1332, the degree of mouth openness is computed based on a bounding box of the inner mouth feature points 816. In an implementation, three values may be exported to express the degree of openness of an open mouth: 0, 50, or 100 depending on the ratio between height and width of the mouth bounding box. Confidence of the mouth status is established as the average confidences of inner mouth 816 and outer mouth 814 face features.

At block 1334, the direction of the gaze of the eyes may be computed by the example facial features projector 114.

At block 1336, the face 102 currently being processed becomes the face 102 that will be tracked in the next video frame 104. After updating a current face bounding box, the example facial features projector 114 sets the next pattern as tracking information 222 to be searched by face processing components, such as the frame processor 204 and inter-frame face tracker 206.

At block 1338, internal face structures with internal identities are converted to external face structures, such as the tracking points 1400 of FIG. 14. Other differences between internal representation and external ones are handled at this step (for example, transforming coordinates from floating point to fixed point representation)

Figure 15A:
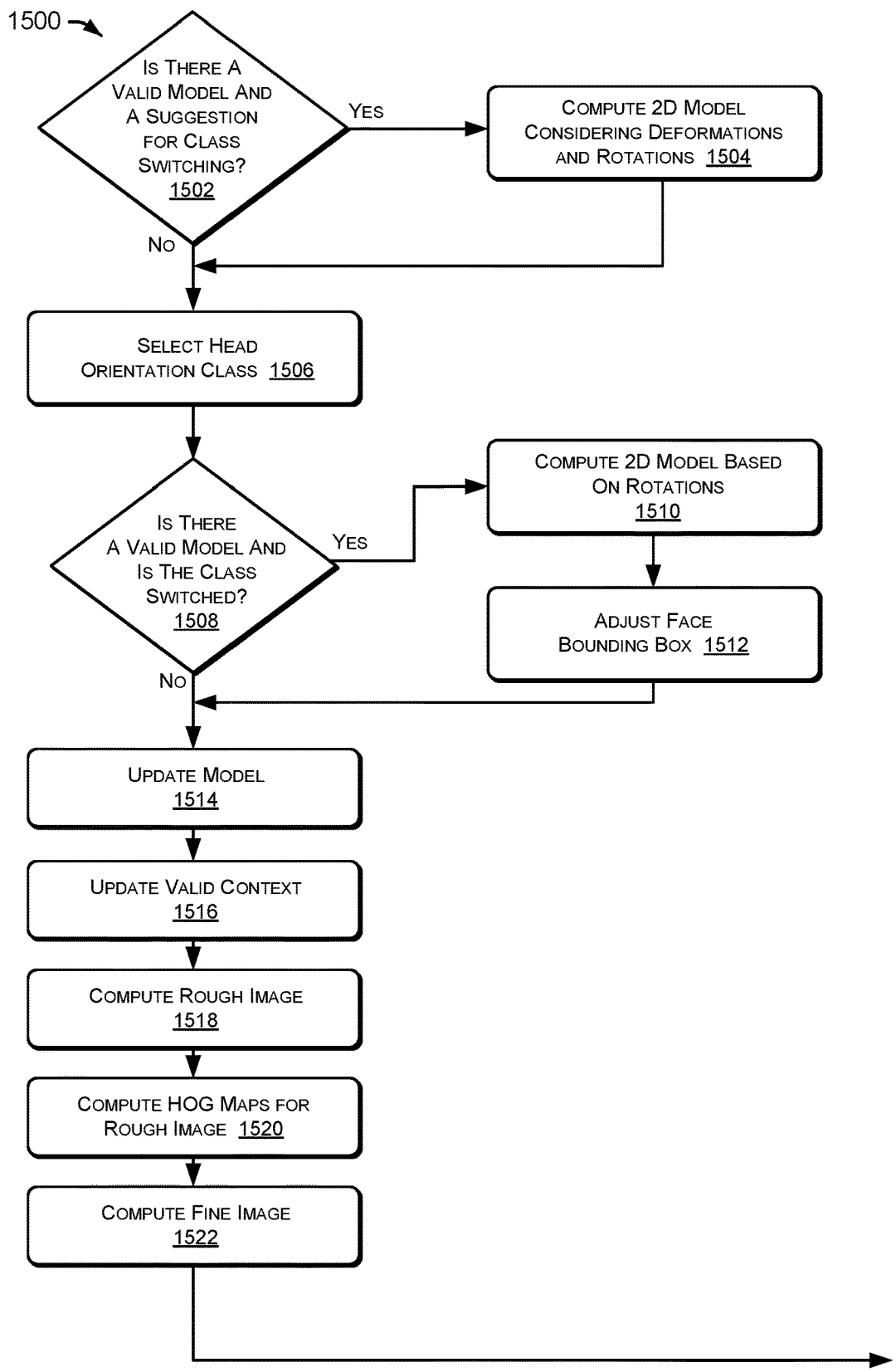
FIG. 15A is a flow diagram of an example process for computing a 3D feature points model for a particular visual face in a video frame.
Figure 15B:
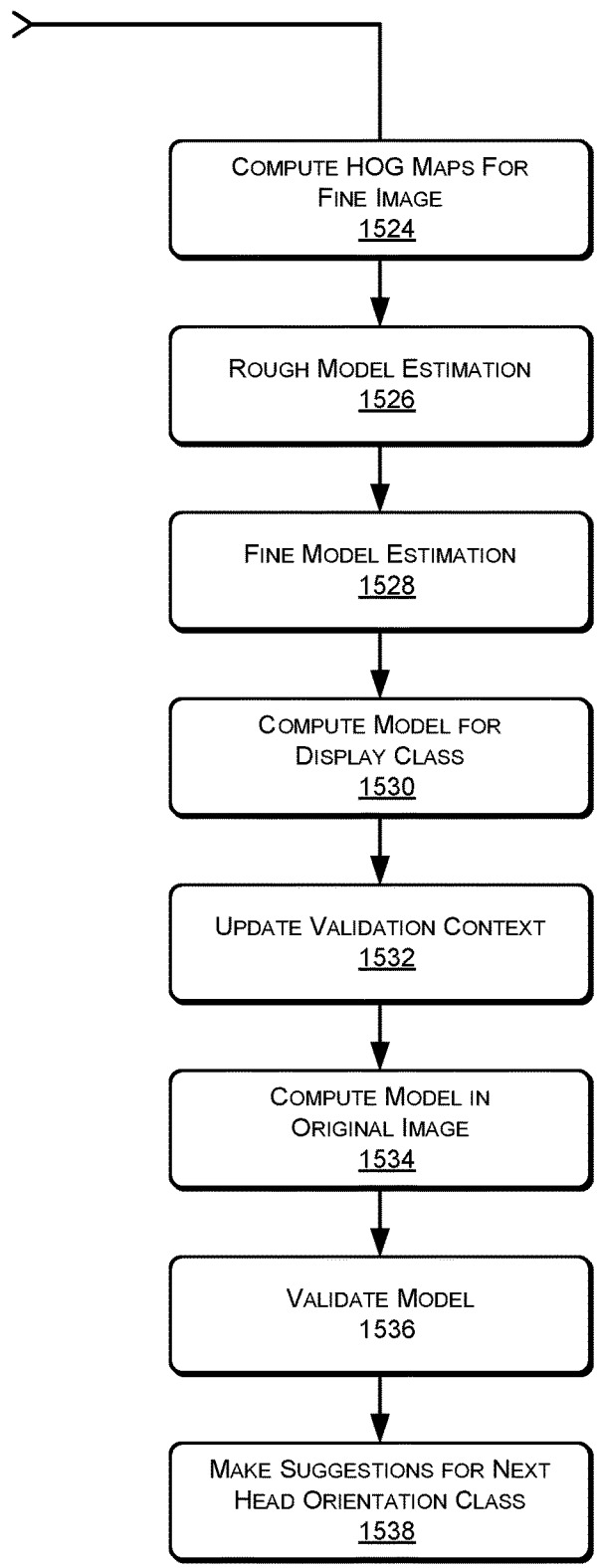
FIG. 15B is a flow diagram of an example process for computing a 3D feature points model for a particular visual face in a video frame.

FIGS. 15A-15B show an example process 1500 for creating the example feature points model 112 for a given face 102 from a video frame 104. The example process 1500 represents operations of various components within the example features tracker 100. In FIGS. 15A-15B, operations of the example process 1500 are shown as individual blocks. The example process 1500 may be executed by components such as the example model generator 110, class selector 210, transformation estimator 212, deformation estimator 214, and model validator 208, for example.

At block 1502, the process assesses whether there is both a previously valid model 112 and a suggestion 222 for switching the head orientation class 108. The example process 1500 operates on either a newly detected face 102 or with a face tracked from the previous video frame 104. For a tracked face, bounding box adjustments are made first. If the head orientation class 108 is switched between video frames 104, causing both the 3D feature points model 112 and the 2D facial landmarks projections 216 to be different between frames 104, then the previous scaling and translation factors are no longer relevant.

In an implementation, a newly detected face 102 is labeled with an "invalid model" flag, which just means that there is not a valid model associated with the previous video frame 104 for the new face 102.

At block 1504, if there exist both a previously valid model 112 and a suggestion for switching head orientation classes 108, then a preliminary 2D model is computed based on the previously valid model 112 and the rotation angles of the suggested head orientation class 108. A component such as the example facial features projector 114 obtains a facial bounding box from the 2D model (that is, from the projection of the previously valid 3D feature points model 112 to a 2D image plane). This operation is performed only when the model validator 208 detects a valid feature points model 112 in the previous frame 104. In an implementation, the computed preliminary 2D model is not stored.

In the case of switching between head orientation classes 108, the bounding box computed for a previous class 108 may be compared with the bounding box to be associated with the models 112 & 216 associated with the new class 108. At this stage of operations for projecting the 2D model 216, scale and translation factors are not relevant. In an implementation, the computed bounding box is a square defined by the facial landmarks 216.

Figure 16:
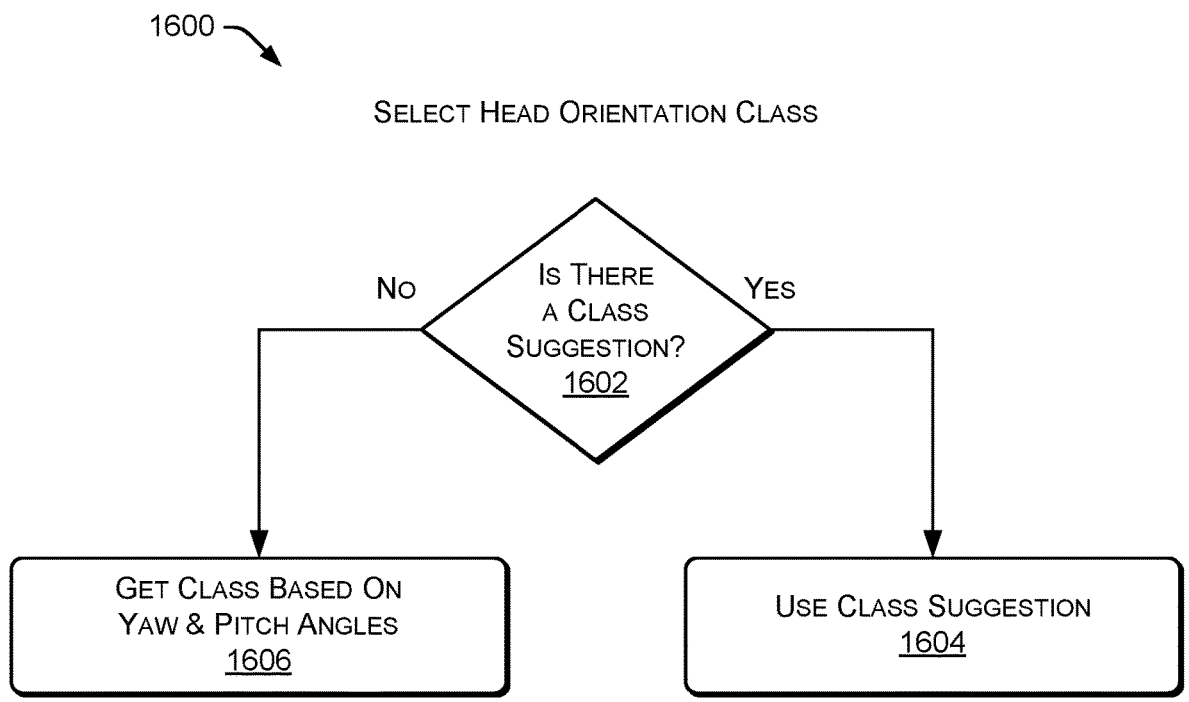
FIG. 16 is a flow diagram of an example method of switching head orientation classes.

At block 1506, logic is applied for selecting a head orientation class 108 for the current video frame 104. An example logic 1600 is detailed in FIG. 16. The tracking information 222 from the previous video frame 104 may suggest a head orientation class 108 for the subsequent video frame 104, as assessed by the model validator 208 or the inter-frame face tracker 206. In FIG. 16, at block 1602, the operation flow evaluates whether there is a class suggestion. If a head orientation class 108 is suggested, then at block 1604, the example features tracker 100 uses the suggested head orientation class 108 from the previous frame 104, on in an implementation, a different head orientation class 108 suggested by the example facial features projector 114 and model validator 208. If there is not a class suggestion, then at block 1606 the model generator 110 selects the next head orientation class 108 based on yaw and pitch angles, choosing a head orientation class 108 that has yaw and pitch ranges that contain the current head orientation. Most often, the operation at block 1606 of selecting a new head orientation class 108 occurs when a new face is detected 202.

At block 1508, if there is both a valid model 112 from the previous video frame 104 and also the head orientation class 108 has been switched, then at block 1510 the 2D model information 216 is computed based on the new rotation angles, and at block 1512, the bounding box around the current face 102 is adjusted to the new 2D facial landmarks 216, the bounding box being a square encompassing the 2D facial landmarks 216, in one implementation. At block 1508, if there is not a valid model 112 or the head orientation class 108 was not switched, then operations 1510 & 1512 are skipped, and the operation proceeds to step 1514.

At block 1514, the 3D feature points model 112 is updated. During the model update, the current feature points model 112 is initialized, meaning that all transformation and deformation parameters are reset, and a preliminary 2D model is computed from the face 102 to initially guide the process, without regard for scaling or translation parameters. The rotation angles are reset, meaning that all head orientation angles are reset to the default values of the newly chosen head orientation class 108, except for the roll angle that needs to be provided from the face detector 202. In an implementation, the default head orientation angles of a newly selected head orientation class 108 are middle values of the ranges established for that class 108. The scaling and translation factors are updated based on the projection of the 3D model 112 in an image plane by the facial features projector 114.

A scale factor is set such that the size of the projection equals the face size associated with fine estimations. Translation factors are established such that the projection center is the same as the center of the working image, computed for fine estimations. Coordinates of the 2D facial landmarks 216 are computed as the projection of the 3D model 112 in an image plane.

At block 1516, a component such as the example model validator 208 updates the validation context, storing information related to initial head orientation angles, initial bounding box of the facial landmarks 216, switching status of the head orientation classes 108, and face type as provided by the face detector 202. This validation context is used during the validation processes. Later, the current face bounding box as associated with the generated 3D feature points model 112 for the actual face 102 is also stored in the validation context.

At block 1518, a rough image is computed. The example features tracker 100 can have two main steps for parameters estimation: rough estimation and fine estimation. In an implementation, the difference between the two is the size of the images being considered. For rough estimation, a smaller resolution of the face 102 may be used that contains less detail, while for fine estimation a larger face 102 is used. The 3D feature point model of the actual face 102 from the video frame 104 is computed from the higher-resolution fine image.

At block 1520, gradient maps for the rough image are pre-computed. In an implementation, histogram-of-oriented-gradients (HOG) maps are computed for each working image 104. During rough and fine estimations, linear classification modules are applied to the areas around each feature point in order to obtain proposals for displacements of facial landmarks. To speed up computation, HOG maps may be pre-computed to simplify future computation of HOG based descriptors. In an implementation, the HOG map associated with an image 104 contains HOGs for all cells in the image 104 of a certain useful size.

At block 1522, a fine image at higher resolution than the rough image is estimated, from which the 3D feature points model 112 is generated. The fine image is derived from a larger, higher-resolution version of the same small image of the face 102 that the rough image is derived from at block 1518.

At block 1524, gradient maps for the fine image created at block 1522 are pre-computed. Histogram-of-oriented-gradients (HOG) maps are computed for each working fine image of a face 102.

At blocks 1526 and 1528, rough and fine model estimations are performed. Model estimation is the process of approximating deformation and transformation parameters for the current video frame 104, as performed by components such as the example transformation estimator 212 and deformation estimator 214. In an implementation, the example features tracker 100 performs both rough and fine estimation, in that specific order. The difference between the two steps 1526 & 1528 is merely the data size or resolution of the working image.

At block 1530, a model for the class to be displayed is computed. When outputting the set of facial landmarks 216, this set of 2D facial landmark feature points 216 may be completed with feature points from a neighboring class 108 that was previously used as the head orientation class 108. This operation is performed for situations in which head orientation angles oscillate between two neighboring classes 108, which can cause some feature points to appear and disappear between video frames 104 (feature points that are visible in one class but not in the other). To address this, there is defined for each head orientation class 108 an additional set of angle ranges, which are the ranges in which feature points from that class are considered for display. In order to display such feature points, they have to be computed in light of current model parameters, except for the deformation parameters, which are not valid for the neighboring class 108.

At block 1532, the validation context is updated with the parameters established thus far.

At block 1534, the feature points model 112 is computed in light of the original image of the face 102. During this step, the feature points model 112 that was computed in light of the working image associated with fine estimation at block 1528 is updated in order to fit to the original image 102. In an implementation, the feature points model 112 is scaled with the inverse of the scaling factor used to obtain the working image and translated with the offset used to compute the working image 102. In order to enable computing 3D features, the facial features projector 114 computes the percent of the scaling factor that was used to compensate for the subject distance. This is performed according to the scaling factor approximated during fine and rough steps, which compensates both for subject distance and the scaling factor used to compute the working image. Also, the facial features projector 114 estimates translations in the image plane, relative to the original image 102.

At block 1536, the feature points model 112 is subjected to validation. After the feature points model 112 associated with current frame 104 has been computed, validation logic computes model confidence. In an implementation, this is accomplished by validating each feature point in the 3D model 112 or the 2D model 216.

At block 1538, the process makes suggestions for the head orientation class of the next video frame 104. This tracking information 222 is passed to the model validator 208, inter-frame face tracker 206, and model generator 110 performing step 1502 above. Based on the model 112 obtained for the current frame 104, a suggestion for the head orientation class 108 can be made for the subsequent video frame 104. The suggested head orientation class 108 can be a class suggested by current head orientation angles, for example, or a class imposed by results of the model validator 208. In an implementation, the model validator 208 can influence the suggestion of a head orientation class 108 when the validator 208 invalidates the nose bridge feature 500, for example when the example features tracker 100 is in a profile (side-view) class 108. In this situation, the validator 208 may force the class 108 to be switched to the closest semi-profile class 108. The closest semi-profile class 108 may be defined as the semi-profile class 108 having the same pitch ranges as a current profile class 108, as in FIG. 10 (used only when the current class is a profile class 108). This feature of the model validator 208 can provide faster performance.

Example Device Contexts

The example features tracker 100 can be integrated into many devices, as described above, such as augmented reality (AR) devices, AR goggles, smartglasses, head-up displays (HUDs), scopes, aircraft systems, auto windshield virtual displays, real-time face tracking and recognition (RTFTR) devices, virtual film production hardware, video-based face recognition systems, surveillance devices, gaming hardware, virtual cosmetics devices, smart phones, selfie and special effects hardware, gesture recognition devices for human-machine interactions and intelligent human-robot interactions, computer vision hardware, machine vision hardware, gesture-based user interfaces, model-based video coding devices, facial motion capture devices, and CGI computer generated imagery production hardware, for example.

Figure 17:
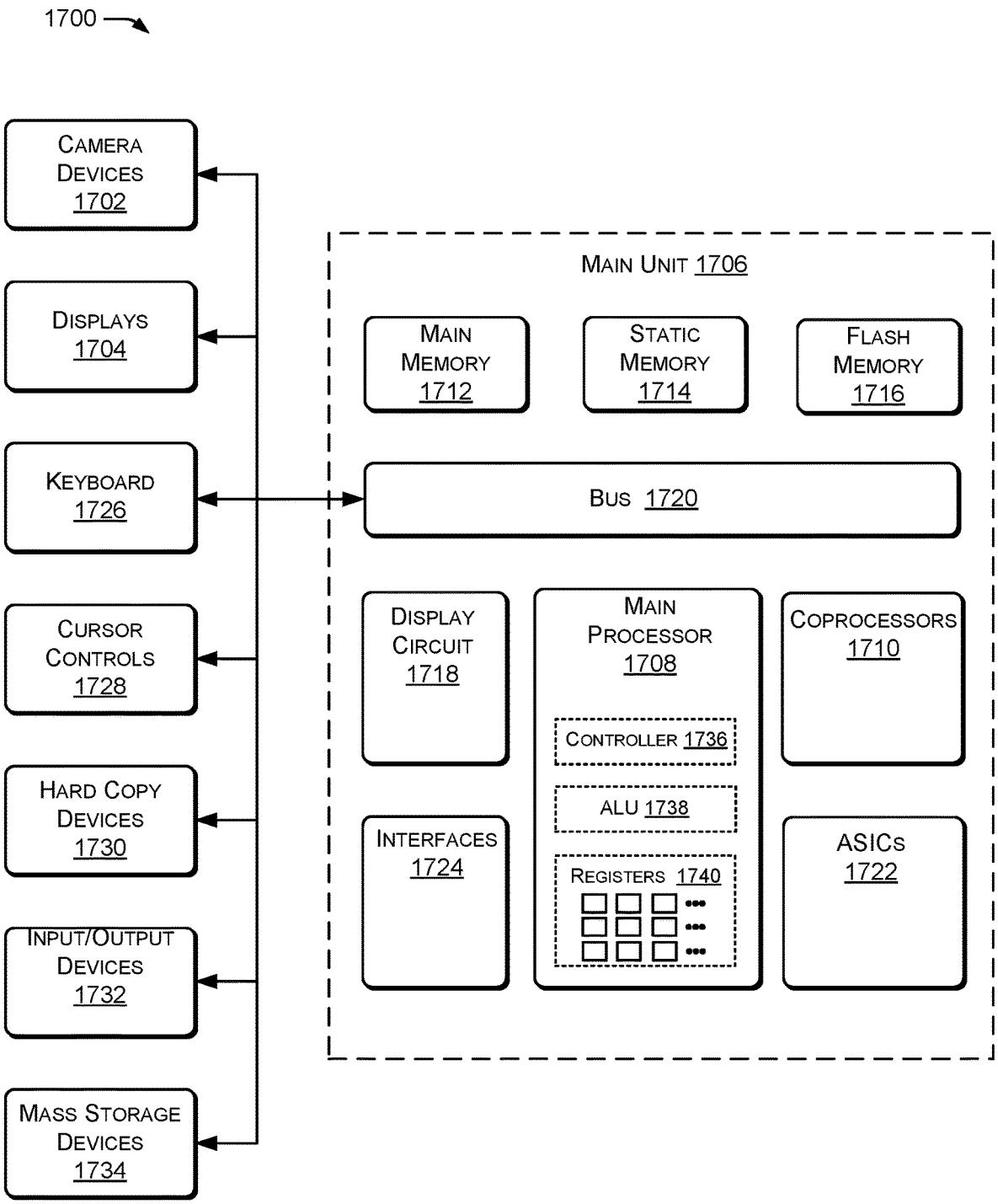
FIG. 17 is a block diagram of an example computing system with hardware for implementing an instance of the example features tracker in real-time.

FIG. 17 shows an example computing system 1700 with hardware for implementing an instance of the example features tracker 100 in real-time. The example computing system 1700 can also be used for training the comprehensive set of head orientation classes 108, or pre-computing templates, databases, files, data structures, and headers used by the example features tracker 100. The facial features tracker 100 with advanced training for natural rendering of human faces in real-time described herein can be implemented and utilized by the example computing system 1700. Computing system 1700 can represent, for example, a general purpose computer, workstation, portable computer, hand-held computing device, smart phone, tablet, camera, video system, surveillance system, or other computing device. The components of computing system 1700 are examples, from which one or more components can be omitted or to which one or more components can be added. For example, one or more camera devices 1702 and display devices 1704 can be used with computing system 1700.

The example computing system 1700 includes a main unit 1706, for example, that includes a central processing unit (CPU) or main processor 1708, and one or more optional coprocessors 1710 coupled to a main memory 1712, a static memory 1714, and/or flash memory 1716, and at least one display circuit 1718 via bus 1720. The example computing system 1700 may include one or more application specific integrated circuits (ASICs) 1722. The example features tracker 100 described herein may be implemented in hardware as one or more of the ASICs 1722. The main unit 1706 may also include one or more interfaces 1724, such a network interface. The main unit 1706 of computing system 1700 may also be coupled to the cameras 1702, displays 1704, keyboard user interface 1726, cursor control device 1728, hard copy device 1730, various input/output (I/O) devices 1732, and mass storage devices 1734 via bus 1720, or other busses.

Bus 1720 can be a standard system bus for communicating information and signals. The CPU or main processor 1708 and coprocessors 1710 may be used for processing operations of the example features tracker 100. The CPU or main processor 1708 may includes a control unit 1736, an arithmetic logic unit (ALU) 1738, and several registers 1740, which can be used by the main processor 1708 for data and information processing. Coprocessors 1710 can also include similar components as the main processor 1708.

The main memory 1712 can be random access memory (RAM) or other dynamic storage devices, for storing data, code, or instructions to be used by computing system 1700. Processing instructions of the example features tracker 100 may reside in the main memory 1712 or in the static memory 1714 or flash memory 1716. In an implementation, the main memory 1712 can store instructions and data related to the feature tracking processes described with respect to the process flows of FIGS. 13 and 15, for example. The main memory 1712 may also store temporary variables or other intermediate data of the example features tracker 100 during execution of code or instructions by the main processor 1708 and optional coprocessors 1710. Static memory 1714 can be read only memory (ROM) and/or other static storage devices, which can store data and/or code or instructions to be used by the computing system 1700. The flash memory 1716 can be a memory device used to store basic input/output system (BIOS) code or instructions for the computing system 1700.

The displays 1704 can display images, information, and graphics to a user. The cursor control 1728 can be a mouse, touchpad, touchscreen, trackball, or cursor direction keys, for controlling movement of an object on display 1704 or for inputting data. The hard copy device 1730 can be a printer, for printing information on paper, film, or some other like medium, or for creating 3D objects. Any number of input/output (I/O) devices 1732 can be coupled to computing system 1700, for example an I/O device such as a sound speaker or microphone can be coupled to computing system 1700.

Mass storage device 1734 can be a hard drive, read/writable CD or DVD unit, or other large volume data storage device. Processing instructions of the example features tracker 100 may reside in one or more of the mass storage devices 1734. Camera devices 1702 can be video image capturing devices, which can be used for the example features tracker 100 described herein.

A machine-readable tangible data storage medium may include a mechanism that provides information in a form readable by a machine such as the computing system 1700 or other digital processing device. For example, the machine-readable medium may include a read only memory (ROM), random access memory (RAM), magnetic disk storage media, optical storage media, flash memory devices, or other like memory devices. A machine-readable tangible data storage medium may store processing instructions of the example features tracker 100. A machine-readable tangible data storage medium can also be used to store instances of the example comprehensive set of 3D head (and face) orientation classes 108, and other data.

In the specification and following claims: the terms "connect," "connection," "connected," "in connection with," and "connecting," are used to mean "in direct connection with" or "in connection with via one or more elements." The terms "couple," "coupling," "coupled," "coupled together," and "coupled with," are used to mean "directly coupled together" or "coupled together via one or more elements."

While the present disclosure has been disclosed with respect to a limited number of embodiments, those skilled in the art, having the benefit of this disclosure, will appreciate numerous modifications and variations possible given the description. It is intended that the appended claims cover such modifications and variations as fall within the true spirit and scope of the disclosure.

The invention claimed is:

1. A method, comprising:
    detecting an image of a face in a frame of a video stream;
    analyzing the image of the face for yaw and pitch angles associated with a head orientation of the face;
    selecting a head orientation class from a comprehensive set of head orientation classes based on the yaw and pitch angles, each head orientation class providing a set of feature points comprising a deformable 3D model of averaged facial features at head orientation angles characteristic of the head orientation class;
    modifying the deformable 3D model of the averaged facial features from the selected head orientation class into a modified 3D model of the image of the face by calculating real head orientation angles and estimate rotational, scaling, and translational factors to apply to the deformable 3D model of averaged facial features;
    calculating a 2D model of tracking points representing the image of the face, the tracking points projected from the modified 3D model onto an image plane; and
    controlling, actuating, or animating a piece of hardware based on the 2D model of projected tracking points.

2. The method of claim 1, further comprising calculating estimate deformation factors representing facial features or a facial gesture when calculating the rotational, scaling, and translational factors to modify the deformable 3D model of the head orientation class into the modified 3D model, wherein deformation directions are pre-computed for each head orientation class.

3. The method of claim 1, wherein controlling, actuating, or animating a piece of hardware based on the 2D model of projected tracking points is selected from the group consisting of displaying the projected tracking points on a display hardware, converting facial motion capture based on the projected tracking points into a digital database for computer-generated imagery (CGI) and special visual effects created with computer hardware, creating an animation on display hardware, creating an animated avatar from the projected tracking points, editing or synthesizing a facial feature on video hardware or smart phone hardware, inserting the projected tracking points into an electronic game, comparing the projected tracking points to facial images stored in a security system database for face recognition and personal identification of a human subject, determining a security risk at an airport security system based on the projected tracking points and actuating an alert, tracking movements and facial expressions of a human subject on security system hardware based on the projected tracking points, performing a facial authentication for gaining access to a hardware or a place based on the projected tracking points, controlling real-time machine-vision hardware based on the projected tracking points, inputting the projected tracking points into a video encoder to make a Moving Picture Experts Group (MPEG) video stream or other video stream, operating a gesture-based user interface for controlling computer hardware based on a human facial gesture represented by the projected tracking points, tracking human physiological and kinematic parameters based on the projected tracking points, and generating intelligent human-robot interactions including robotic hardware motions based on the projected tracking points.

4. The method of claim 1, wherein the comprehensive set of head orientation classes comprises 35 different 3D head orientation models representing 35 different head orientations with respect to a camera view of the video stream, wherein each 3D head orientation model has averaged facial features for the respective head orientation with respect to the camera view.

5. The method of claim 1, further comprising automatically marking a collection of images for each head orientation class; and
    for each respective deformable 3D model of the comprehensive set of head orientation classes, training each of the deformable 3D models separately based on the respective collection of automatically marked images for that head orientation class.

6. The method of claim 1, further comprising separately training each of the deformable 3D models associated with each head orientation class of the comprehensive set of head orientation classes, comprising applying principal component analysis (PCA) to derive realistic axes of head motion for each deformable 3D model.

7. The method of claim 1, wherein the deformable 3D models associated with the comprehensive set of head orientation classes are modeled by a set of feature points representing a selected set of facial landmarks, wherein a respective subset of the set of feature points is utilized for each deformable 3D model of each respective head orientation class.

8. The method of claim 7, wherein the set of feature points comprises 107 feature points representing the facial landmarks.

9. The method of claim 7, wherein the subset of feature points for the respective deformable 3D model of a given head orientation class includes only feature points visible from a camera view of the video stream based on the head orientation angles of the respective head orientation class.

10. The method of claim 7, further comprising assigning a set of support vector machine (SVM) local classifiers to each single feature point in each respective subset of the feature points for each head orientation class;
  specifically training the set of SVM local classifiers assigned to each single feature point to model and track the single feature point of the respective subset of the feature points for the respective head orientation class of the comprehensive set of head orientation classes; and
  during an online run, the SVM local classifiers for a single feature point projecting the 2D model with respect to the single feature point from the modified 3D model for the single feature point.

11. The method of claim 10, further comprising
  determining a validity of the 2D model based on an imposed threshold of validated feature points.

12. The method of claim 10, further comprising training SVM local classifiers specifically for determining a blink or non-blink state of an eye of the face in the image of the face from the frame of the video stream.

13. The method of claim 1, wherein the 2D model provides at least some projected tracking points representing facial landmarks occluded or missing in the image of the face from the frame of the video stream.

14. The method of claim 1, wherein the head orientation angles include, from a 3D frame of reference with respect to a camera view of the video stream, a roll angle of the head orientation around a sagittal z axis, a yaw angle of the head orientation around a vertical y axis, and a pitch angle of the head orientation around a horizontal x axis.

15. The method of claim 1, further comprising warping the image of the face from the frame of the video stream to match facial features from the image of the face with initial feature points of the selected head orientation class.

16. The method of claim 1, further comprising validating each individual projected tracking point of the calculated 2D model of the image of the face; and
  determining the 2D model of the face is valid when a percent of validated projected tracking points is greater than a threshold value.

17. The method of claim 16, further comprising tracking a face displacement between adjacent frames in the video stream; and
  suggesting one or more head orientation classes and associated deformable 3D model for the next frame in the video stream based on a validity of the 2D model for the image of the face in a current frame in the video stream.

18. The method of claim 16, further comprising switching head orientation classes for a next frame in the video stream when the 2D model for the previous frame is invalid or when a head orientation changes from a previous image of the face from a previous frame of the video stream to a current image of the face from a current frame of the video stream.

19. The method of claim 16, further comprising computing a preliminary 2D model of the image of the face to determine a size and a placement of a bounding box for the image of the face prior to selecting a head orientation class, the bounding box comprising a square defined by facial landmarks; and
  initializing a next frame in the video stream with an image of the face from the bounding box of the computed preliminary 2D model for that frame when the 2D model of the face for the previous frame is not valid.

20. The method of claim 1, further comprising determining an additional facial feature from the modified 3D model including a placement of eye sockets, a blink status, a placement of eye pupils, a gaze direction, a mouth status, or a fatigue level.

* * * * *